(12) United States Patent
Zumpano

(10) Patent No.: US 7,523,956 B2
(45) Date of Patent: Apr. 28, 2009

(54) INFLATABLE RESTRAINT ASSEMBLY FOR VEHICLES

(76) Inventor: Bernard J. Zumpano, 9971 SW. 128th St., Miami, FL (US) 33176

( * ) Notice: Subject to any disclaimer, the term of this patent is extended or adjusted under 35 U.S.C. 154(b) by 341 days.

(21) Appl. No.: 10/544,287

(22) PCT Filed: Feb. 3, 2003

(86) PCT No.: PCT/US03/03339

§ 371 (c)(1),
(2), (4) Date: Aug. 3, 2005

(87) PCT Pub. No.: WO2004/069610

PCT Pub. Date: Aug. 19, 2004

(65) Prior Publication Data

US 2006/0192367 A1   Aug. 31, 2006

Related U.S. Application Data

(63) Continuation-in-part of application No. 09/825,036, filed on Apr. 3, 2001, now Pat. No. 6,513,829, which is a continuation-in-part of application No. 09/470,922, filed on Dec. 23, 1999, now Pat. No. 6,209,908.

(51) Int. Cl.
*B60R 21/16* (2006.01)
(52) U.S. Cl. .................................. 280/730.1
(58) Field of Classification Search .............. 280/730.1, 280/734, 735
See application file for complete search history.

(56) References Cited

U.S. PATENT DOCUMENTS

| | | | |
|---|---|---|---|
| 3,430,979 A | 3/1969 | Terry et al. | |
| 3,466,090 A | 9/1969 | Posey | |
| 3,703,313 A | 11/1972 | Schiesterl et al. | |
| 3,802,719 A | 4/1974 | Brown | |
| 5,131,683 A | 7/1992 | Johnson | |
| 5,292,176 A | 3/1994 | Artz | |
| 5,470,103 A | 11/1995 | Vaillancourt et al. | |

(Continued)

FOREIGN PATENT DOCUMENTS

DE   4041049 A1   7/1992

(Continued)

OTHER PUBLICATIONS

International Search Report dated May 14, 2001 for related PCT Application No. PCT/US00/35143.

(Continued)

*Primary Examiner*—Faye M. Fleming
(74) *Attorney, Agent, or Firm*—Howard IP Law Group, PC

(57) ABSTRACT

A plurality of inflatable members (136, 140, 142, 156') are mounted at a plurality of strategic locations relative to a vehicle occupant. The occupant is restrained by a harness including a lap belt segment (124), a chest belt segment (126) and a diagonal belt segment (128). Upon the vehicle being impacted, a central processor automatically inflates the inflatable members (136, 140, 142, 156'). The processor is connected to valve assemblies that regulate air flow both into and out of the inflatable members (136, 140, 142, 156'), and is further responsive to a pressure sensor assembly, so as to actively regulate pressure within the inflatable members.

13 Claims, 17 Drawing Sheets

U.S. PATENT DOCUMENTS

| | | |
|---|---|---|
| 5,472,234 A | 12/1995 | Chang |
| 5,642,902 A | 7/1997 | France |
| 5,646,613 A * | 7/1997 | Cho .......................... 340/903 |
| 5,707,078 A | 1/1998 | Swanberg et al. |
| 5,806,891 A | 9/1998 | Pokhis |
| 5,842,718 A | 12/1998 | Byon |
| 5,927,753 A | 7/1999 | Faigle et al. |
| 5,947,514 A | 9/1999 | Keller et al. |
| 6,068,288 A | 5/2000 | Karolek et al. |
| 6,217,069 B1 | 4/2001 | Ganesan |
| 6,237,945 B1 | 5/2001 | Aboud et al. |
| 7,232,001 B2 * | 6/2007 | Hakki et al. ................ 180/271 |

FOREIGN PATENT DOCUMENTS

| | | |
|---|---|---|
| EP | 0965500 A2 | 12/1999 |
| GB | 2303479 A | 2/1997 |

OTHER PUBLICATIONS

International Search Report dated Jan. 27, 2004 for related PCT Application No. PCT/US03/03339.

* cited by examiner

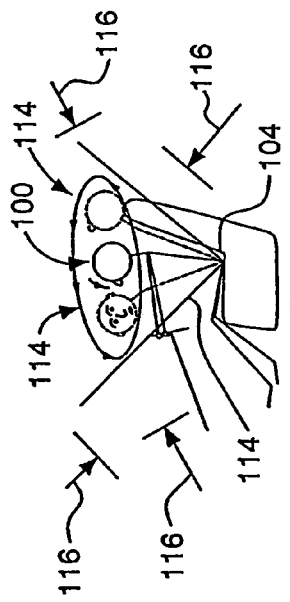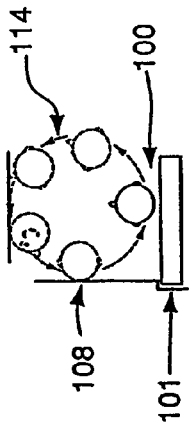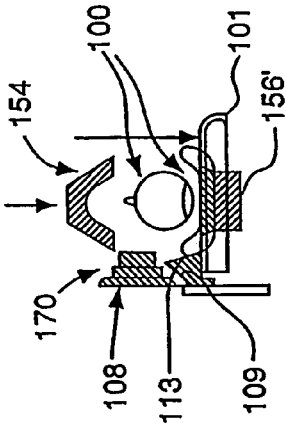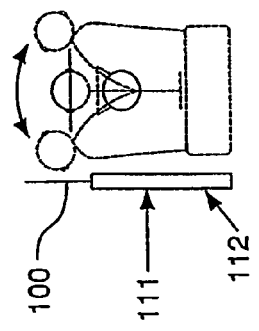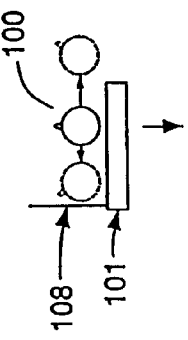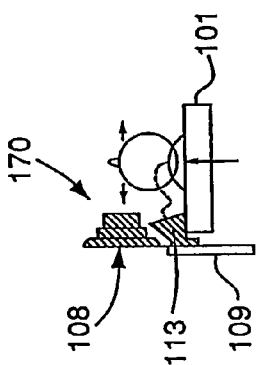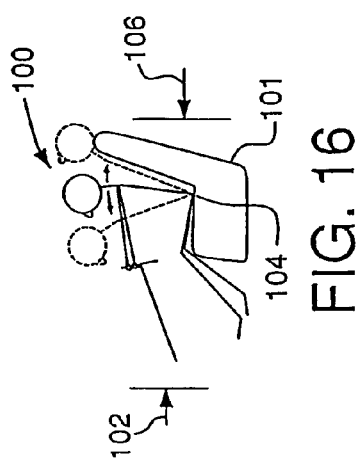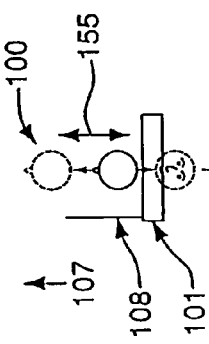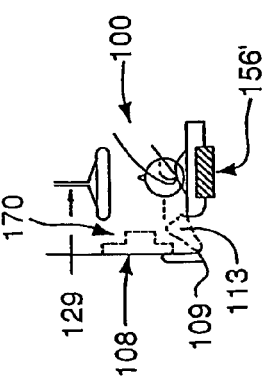

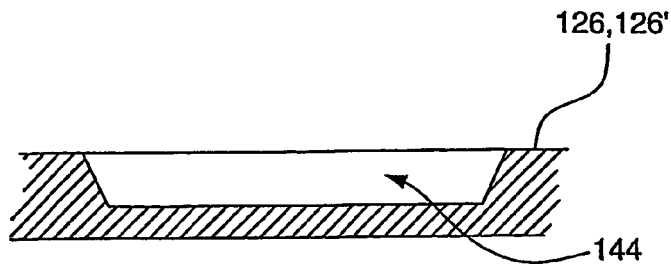
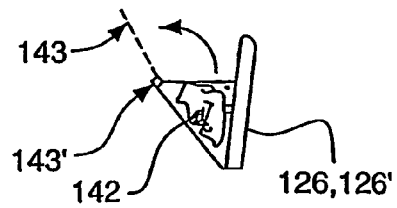
FIG. 34
FIG. 35
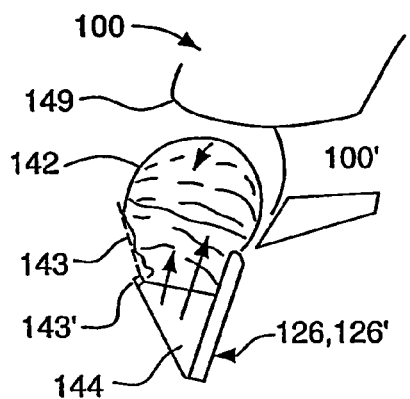
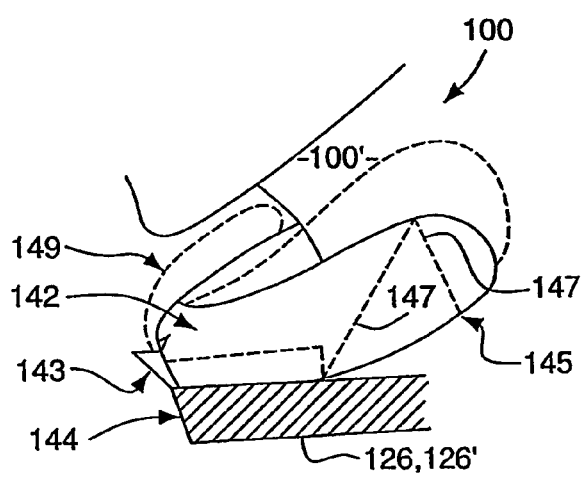
FIG. 36
FIG. 37
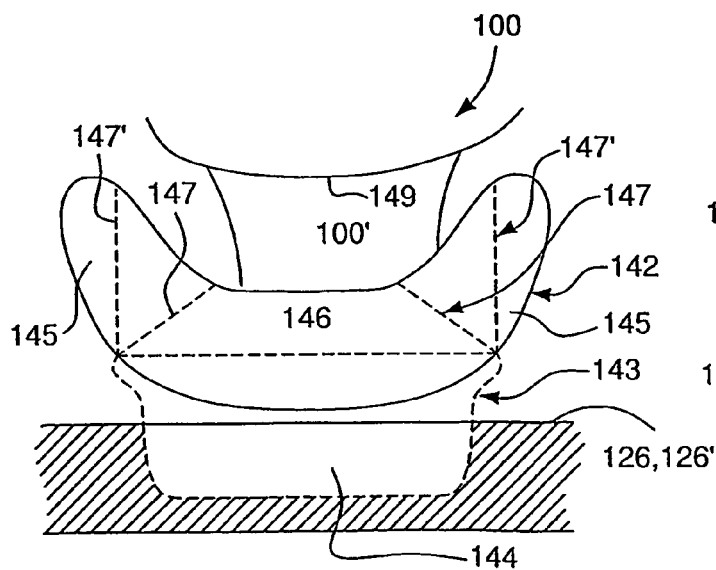
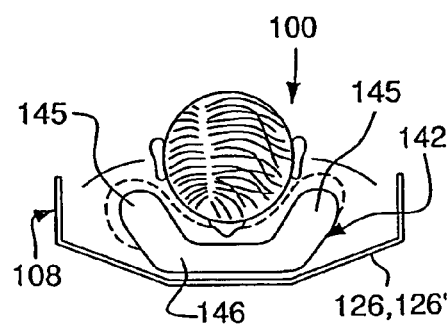
FIG. 38
FIG. 39

INFLATABLE RESTRAINT ASSEMBLY FOR VEHICLES

This application claims the benefit of Int'l. Application No. PCT/US03/003339, filed Feb. 3, 2003, and is incorporated herein by reference, and is a continuation-in-part of U.S. patent application Ser. No. 09/825,036, filed Apr. 3, 2001, now U.S. Pat. No. 6,513,829, which is a continuation-in-part of U.S. patent application Ser. No. 09/470,922, filed Dec. 23, 1999, now U.S. Pat. No. 6,209,908, each of which is hereby incorporated herein by reference in its entirety.

FIELD OF THE INVENTION

This invention relates to an inflatable restraint system primarily designed for use within a motor vehicle to protect occupants when the vehicle is involved in an accident, and specifically, a collision or other type of crash or impact. The inflatable restraint system comprises a central processing unit or other processor operatively connected to both a sensor assembly and a variable valve assembly in order to initially inflate and actively regulate pressure within a first and second plurality of chambers, respectively defining impact absorption and impact resistance zones, disposed on the interior of each of one or more inflatable members mounted at strategic locations adjacent intended occupant positions within the vehicle.

DESCRIPTION OF THE RELATED ART

Every year, thousands of people in the United States alone are involved in motor vehicle accidents, many of which result in the death of one or more occupants and/or severe bodily injury to others. Aside from the devastation and havoc these accidents cause in people's lives, they also result in costs of over five billion dollars annually to the insurance industry, health care industry, health care providers, the federal government, public health agencies and many others. It should, therefore, be clear that the cost of morbidity (long term injury consequences) to the automobile and insurance industries is staggering.

Most current methods of reducing injury are predicated upon the principle of safety restriction and immobilization using seat belts and the use of single or multiple air bags. With regard to the inflation of the air bags in an emergency condition, the in-filling pressure dynamics are known to cause direct chest, face, eye, and sometimes brain and spinal injury when they are deployed against the passenger in an attempt to deal with impacting forces only from the view point of the passive absorption of such forces. Moreover, known air bag structures and designs are inflated towards the occupant. Accordingly, with regard to conventional seat belt construction, diagonal chest belt restraints, are disposed such that they have a tendency to rub across an anterior portion of the neck. Medical publications report complications of carotid artery thrombosis and subsequent stroke from blunt trauma to the neck from seat belts. Similarly, lap seat belts are known to cause pelvic and extremity injuries as well as blunt abdominal trauma. The fact that such air bags and seat belts save lives and reduce injury is not in question. However, most vehicular injuries, particularly those occurring at high speeds are not entirely predictable or preventable, especially with the use of these known or conventional devices.

The mechanisms which cause injuries in humans involves the summation of deceleration forces, and in particular those linear momentum, angular momentum and torque-rotation, vertex-loading, centripetal and centrifugal coefficient restitution forces and spinal "crunch" forces. Most of these can not be prevented because they occur probably within the first three seconds of low velocity accidental impact, and within the first 150 milliseconds of high velocity impacts, wherein the effect of such forces is completed, usually within 250-350 milliseconds. Thus, early on, the forces have already acted to produce injury and conventional seat belts and air bags become passive recipients of those forces, reducing somewhat but not them actively opposing them.

Accordingly, it should therefore be recognized that some injuries are due more to linear momentum and deceleration forces, and others to angular momentums with deceleration forces. Added to these are a combination of torque forces, centrifugal and centripetal forces and the "crunch" forces due to spinal loading. Moreover, all of these forces are summated by the time the air bag is impacted by the body of the occupant. As forth above, the result is that the most the belt restraints and air bags can do, even when cooperatively reacting with one another, is to passively absorb such forces. When the summation of these forces are greater than the ability of the human body to tolerate them, tissue deformation occurs with the resulting injury. Calculating these forces is difficult to uncertain because the calculations must take into account angles of deflection, balance and the elasticity of human tissue. For this reason, I restrict the discussions below of scientific principles to simpler concepts and standard formulas of physics and biophysics for conceptual understanding.

None of the injuries, which occur in motor vehicle accidents, are totally predictable or preventable since the exact time or circumstances of a motor vehicle accident are not always known or predictable. In other words in most instances where serious accidents are under consideration, the current state of the art permits incomplete reduction of injury forces with the result being that total prevention remains elusive. Similarly, no two human bodies react in the same way to injury forces. In other words, the variables over which there is no control are significant. To date, there is no known way to totally prevent injury, particularly in high velocity conditions. There is however, a better way to reduce and control the harm caused by the summation of forces of deceleration, which cause injury.

As set forth above attempts to protect the occupants in a motor vehicle have for the most part included seat belts, also known as restraint harnesses and more recently, inflatable air bags. Such devices are most certainly a step in the right direction, and when used properly, have saved a tremendous number of human lives. Even so, both seat belts and air bags suffer from distinct disadvantages. By way of example, harness restraints including lap belts, chest belts, etc., limit the forward or lateral motion of the body's acceleration caused by an impact, but in doing so, such restraints cause the base of the neck to act as a fulcrum or axis of rotation-flexion-extension to further accentuate the force of acceleration of the head on the neck. More specifically, when there is a collision, the motor vehicle is usually stopped by the impact, but the forces applied to the body and restrained by the seat and/or lap belts are nevertheless also acting to set the head in motion upon the neck, leading to impact injuries caused by a collision of the head against the front or side window, ceiling of the car or steering wheel. Thus, the common mechanism of injury to the brain, spine and/or spinal cord in head-on collisions is an acceleration-declaration of the head, and the neck, causing a hyperflexion-hyperextension injury, whereas in broad-side collisions, the head is accelerated to the side or laterally causing a lateral-flexion injury.

Most modern day motor vehicles use a combination of restraint harnesses and inflatable air bags, which typically, inflate during a collision in an extremely rapid manner from the steering wheel and/or front console area of the vehicle and towards the occupants. Thus, inflatable air bags are intended to cushion the occupant as he or she is thrust forward, under the forces being applied during a head on collision, and impacts the air bag. While the provision of air bags on modern day motor vehicles has certainly brought down the mortality rate, meaning that more people can survive the violent forces of a head on collision, the injury rate is thought to have increased, meaning that survivors of these and other types of crashes often suffer from serious head, neck and/or spinal cord injuries. That is because by the time air bags are deployed, the forces caused by the vehicular impact are already acting on the body and, as set forth above, cause acceleration-declaration of the head on the neck as well as of the torso on the hip. In some instances, air bags have even been reported to cause nasal and facial fractures and, in extreme circumstances, result in the forcing of bone fragments into the brain. Further, the direction of air bag discharge is almost invariably towards the occupant and can promote hyperextension injury to the spine or posterior head injury. This is prevalent and can be particularly dangerous in elderly persons with osteoporosis, a thinning of the bones with age due to calcium depletion.

There have been some attempts to improve the protection for motor vehicle passengers, which have primarily been directed to the deployment of air bags from multiple locations within the vehicle, in order to surround an occupant with restraints. Such attempts have found favor and are promoted primarily by some European car manufactures, most notably those which proclaim the benefits of "side air bags." While adding to the expense of the automobile, these and other multi-location deployment systems have been offered in response to an increased demand to solve the problem of multiple trauma injuries, prevalent in impact accidents. Further, such attempts reflect the desire of the motor vehicle industry to control and find a solution to problems that continue to cause death, disability and injury at an ever increasing rate. Such attempts are also a positive step forward in the effort to reduce death and serious bodily injury during accidents due to direct impact to the vehicle. However, even air bags that deploy from the side or other location in a motor vehicle do not effectively address the forces at work during an impact that cause acceleration of the head relative to the neck, and/or the neck relative to the torso, and therefore, the problem of brain, spine, neck and torso injuries resulting from such accidents have also not been adequately addressed.

SUMMARY OF THE INVENTION

Accordingly, there remains a need in this art for a restraint assembly which is designed and structured to more actively intercept at least the head and neck motion of an occupant riding in a motor vehicle undergoing a collision or other impact. More specifically, there is a need for an inflatable restraint assembly which attempts to actively oppose the forces of impact between a passenger and an air bag, sufficiently to diffuse such forces by applying an equal and opposite force, while buffering the passenger's impact, and thereby, reducing dynamically and actively, the range of motion of the head, neck and torso, caused by the impact as well as acceleration-declaration. Any such improved restraint assembly developed would preferably also utilize at least two, oppositely disposed and pressure sensing inflatable members, each having a plurality of chambers, and further, through the application of microcomputer-microprocessor technology, initiate a positive gradient increase in pressures to some, but not all chambers of the pressure sensing inflatable member, for the specific purpose of slowing the acceleration—declaration forces at work on an occupant's body, while applying an equal and opposite force to the force of impact of the occupant's body with the other(s) of the inflatable members. Any such improved restraint system should further include a plurality of inflatable restraint devices or bags strategically located at various points throughout the passenger compartment, including but not necessarily limited to the ceiling, door post and seat belts, so as to provide as much surrounding or "global" protection as possible, with the goal being to significantly reduce injury by a reduction of the forces exerted on the occupant's body during impact type accidents. In addition, any such improved restraint assembly developed should also overcome the long existing problems of known restraint systems through the ability to actively oppose impact forces "intelligently" through a series of dynamic pressure measurements conducted in response to the acceleration—deceleration to the various portions of the passenger's body as the body impacts substantially oppositely disposed, but cooperatively positioned, inflatable members.

In addition to the above, any such improved restraint assembly developed should have the capability of storing data for determining and recalling related information, such as predicted speed of impact and a record of pressure sensing data Such data could be correlated with post injury medical findings to determine, over a period of time, what impact and pressure ranges cause disabling injury as versus those impact and pressure forces which are only suspect at the present time. Such memory capabilities would serve as a meaningful tool of analysis and benefit to the medical and insurance industries, among others.

Finally, a preferred restraint assembly should also incorporate the use of a restraining harness which is adjustable to accommodate occupants of various sizes and is structurally modified to better protect, in terms of restraint, various portions of the occupants body. In addition, the restraining harness may further include at least one inflatable member which may be structured as described above and when inflated is directed outwardly from the restraining harness and the frontal area of the occupant.

The present invention is intended to address these and other needs which remain in the art and is directed towards an inflatable restraint assembly that is primarily, but not exclusively, designed for use within a motor vehicle. The restraint assembly comprises a plurality of inflatable members, which are strategically mounted throughout the interior passenger compartment of the vehicle at locations adjacent to an intended occupant position, such that deployment of one or more of the inflatable members will provide maximum protection to an occupant, when located in one of the intended positions normally occupied. Further, it is emphasized that while a detailed explanation of the structural and operative features of the present invention will be described relative to at least one inflatable member, one feature of the present invention is the cooperative positioning of two or more of such inflatable members, so as to be "globally" oriented or collectively disposed in at least partially surrounding, alternative intercepting relation to each of the occupants. Such cooperative and collective positioning of a plurality of the inflatable members of the present invention are, in certain instances, specifically intended to significantly reduce injury to the occupant caused by an excessive acceleration or forward motion followed immediately by a rebounding deceleration, which often occurs through the use of conventionally known air bags or inflatable restraint devices. In such known systems, the conventional air bag structure is forcibly inflated resulting in a deployment of the bag in a direction substantially towards the occupant. As a result, the occupant frequently suffers damage upon impact with the conventional air bag and quite frequently suffers hyperextension and/or hyperflexion type injuries, due to a forceful forward and backward acceleration of the head on the neck and/or the body torso upon the lower back and hip.

In order to avoid these types of well recognized problems associated with the use of conventional inflatable restraint systems and structures, the present invention utilizes a central processing unit or other type of processor, which is electrically connected or otherwise operatively associated with a valve assembly and an inlet and outlet pressure sensor assembly, so as to initially deploy, through inflation, the one or more inflatable members into their operative position. The processor, valve assembly and sensor assembly are operatively interactive to diffuse the force of impact caused by the occupant contacting cooperatively positioned ones of the plurality of inflatable members. More specifically, each of the inflatable members of the present invention actively opposes the force of impact between the occupant and the inflatable member and does so "intelligently" through a series of dynamic pressure measurements, made each time the head, neck or torso of the occupant rocks in a "to-and-fro" motion, impacting at least one, but under certain conditions, at least two substantially opposing and alternately intercepting inflatable members.

The sensor assembly is structured to detect the pressure inside a plurality of internally disposed chambers within each of the inflatable members, and to relay the data relating to the internal pressure within the various chambers of each of the inflatable members to the processor. The processor activates a source of inflatable material or fluid, such as air, and initiates operation of the aforementioned valve assembly to provide an initial inflation pressure in predetermined ones of the plurality of chambers of the one or more inflatable members. The pressure within each of the inflatable members is then actively regulated or adjusted to accommodate the force of impact of the occupant with the inflatable member in a manner which causes both a resistance to and at least a partial absorption of the force of impact. The active and "intelligent" regulation of the pressure within the inflatable members serves to reduce any type of repetitive to-and-fro motion, as set forth above. When two substantially opposing inflatable members are working in concert, each has the internal pressure thereof actively regulated or adjusted on an alternating, repetitive basis in order to reduce the to-and-fro impact motion or acceleration-deceleration of the occupant, to a series of lesser motions or oscillations of the head and torso.

Upon the vehicle being impacted, at least one of a plurality of impact sensors, located on the vehicle and connected to the aforementioned processor, communicates in micro-seconds, the occurrence of an impact of sufficient predetermined force to possibly cause injury to the occupant within the passenger compartment. Upon such indication, the processor activates also within micro-seconds a source of fluid or other inflatable material and/or the valve assembly to cause an initial inflation and resulting deployment of at least some of a plurality of inflatable members.

At least one, but preferably all, of the inflatable members comprise a number of internally disposed chambers, wherein adjacent ones of such chambers are separated from one another by a partition. While the actual number of chambers within each inflatable member may vary, the chambers are collectively disposed and cooperatively structured to define an impact absorbing zone and an impact resistance zone within each of the inflatable members. For purposes of clarification, the impact absorption zone may be defined by at least one, but most probably, a first plurality of internally disposed chambers defining a "leading" portion of the inflatable member. The term "leading" portion is meant to describe that portion of the inflatable member which first contacts the head or other portion of the occupant's body. The impact resistance zone is located "rearwardly" of the impact absorption zone and is defined by at least one but preferably a second plurality of chambers.

While the inflatable restraint assembly of the present invention contemplates the use of at least one inflatable member having the aforementioned impact absorption zone and impact resistance zone, maximum protection to the one or more occupants may best be provided through the use of at least two of the aforementioned inflatable members, disposed in substantially opposing relation to one another. When such two inflatable members are cooperatively positioned they each act as "interceptors" for the purpose of reducing the normal, relatively excessive to-and-fro motion to lesser oscillations by allowing the force of impact of the occupant onto a first of the inflatable members to be at least partially absorbed, but at the same time, resisted by actively regulating the pressure within the first inflatable member. At the same time, the pressure within the inflatable member needed to respond to the degree of the force of impact of the occupant thereon is determined. This information is then relayed, through cooperative workings of the sensing assembly with the processor, to communicate the expected and/or summate force of impact of the occupant onto the second or intercepting one of the cooperatively positioned two inflatable members. The relayed information then allows the pressure within the second of the inflatable members to be further regulated or varied to again absorb the force of impact onto the second inflatable member. As will be explained in greater detail hereinafter, the processor and sensor assembly are cooperatively structured and operationally functional so as to arrive at a summation of the pressure within each of the inflatable members and vary the total pressure so as to accomplish absorption of the force of impact of the occupant by means of at least partial deflation of the impact absorption zone while maintaining an opposing resistance force in the impact resistance zone of each inflatable member. The summation of the pressure within any of the inflatable members, should not exceed the force of impact of the occupant onto the inflatable member, so as to not result in a forcible rebounding of the occupant, which would add to the acceleration/deceleration or to-and-fro motion of the occupant.

The inflatable restraint assembly of the present invention also comprises one or more cooperative pairs of the inflatable members being located strategically throughout the various portions of the passenger compartment, wherein such strategic locations include but are not limited to the ceiling, side or door post of the vehicle, shoulder or body harness, etc. In addition, the one or more inflatable members could be mounted directly on an auxiliary seat, such as a child seat, so as to be structured to operate in substantially the same manner. In each of the aforementioned embodiments, one feature of the present invention is that in most cases, the initial inflation and deployment of each of the inflatable members does not occur in a direction that is directly towards the occupant. Such directional deployment of known conventional air bags has, as set forth above, in some cases resulted in severe injury to the occupant.

In another aspect of the invention, a system is provided for restraining occupants of a motor vehicle. The system includes inflatable members mounted on the vehicle and collectively positioned in substantially surrounding relation to an occupant location, a fluid source connected to the inflatable members, a pressure sensing assembly disposed to sense pressure of at least some of the inflatable members, impact detectors positioned to detect a location of an impact between the motor vehicle and an object, and a processor operatively connected to the pressure sensing assembly, the fluid source, and the impact detectors. Each of the inflatable members is cooperatively structured with the fluid source and the processor to inflate into an operative orientation upon instructions from the processor. The processor provides instructions for selectively and sequentially inflating the inflatable members in response to a detected location of an impact, and for regulating pressure within the inflatable members.

In one aspect of the invention, sensors provide information to a processor which, relying on various algorithms, look-up tables, and the like, intelligently instructs responses to a system of inflatable restraints. Such responses include the selection, timing and infilling pressures of inflatable members. As modem processing times are generally measured in microseconds, and the forces of injury generally act in milliseconds, the use of such high-speed intelligent analysis and response provides a time advantage over the forces of injury.

In one aspect of the invention, active opposition is provided to forces of injury. This active opposition to forces is accomplished by the selection of the timing and infilling pressures of inflatable restraints as described below.

The various preferred embodiments of the present invention as described above, as well as additional preferred embodiments to be described hereinafter, are intended to overcome many of the disadvantages and problems associated with conventional restraint systems. As with the preferred embodiments described above, the preferred embodiments described hereinafter are specifically directed to better protect occupants in a motor vehicle.

More specifically, the improved restraint assembly of the present invention is based in part on a recognition of the fact that front end vehicle impacts primarily cause more anterior/posterior flexion of the head, neck and the spinal column, wherein the junction of the base of the spine in the low back serves as the fulcrum or point of motion. This is the location where the lumbar spine fixates to the pelvis and sacrum. The spinal column therefore acts as a long lever, "whipping" the head upon the neck, with or without internal impacts within the vehicle. Side collisions do the same, but put the spinal column, head and neck in a whipping direction of lateral flexion and rotation, from side to side. Oblique impacts from either front or rear diagonal impact positions add a component of rotation and angular momentum to the long lever-arm of the spinal column, causing what may be generally referred to as a "conical" range of motion of angular momentum of the head and neck upon the base of the spine. In further defining the aforementioned conical range of motion, the base of the spine is used as or defines the apex of the formed conically configured range of motion.

Video tape footage of dummy collision models frequently demonstrate forces of both momentum and rotation, as well as the lack of adequate restraint provided by diagonal seat belt (chest) restraints. Their failure to adequately eliminate the aforementioned lever action of a long lever arm (the entire spinal column), causes frequent severe whipping of the head on the neck, by a combination of torque, centrifugal, and rotational forces, all responsible for head and neck injuries including "whiplash". Therefore, the additional preferred embodiments of the restraint assembly of the present invention provides strategically and "globally" placed inflatable members, which may be computerized or processor controlled. Further, the plurality of inflatable members are specifically disposed to be operatively oriented relative to strategic passenger positioning, as will be described in greater detailed hereinafter.

Further, the restraint assembly of the present invention accomplishes strategic movement restriction of the spinal column, head and neck to reduce the forces of deceleration, linear and angular momentum, flexion, extension and rotation through the use of a plurality of inflatable members and/or a restraint harness. More specifically, in certain strategic locations within a vehicle, one or more of the inflatable members are deployed away from the body towards, for example the steering wheel. In this particular embodiment, one or more deployed inflatable members meet and confront a cooperatively disposed and structured inflatable member, issuing from the vehicle interior, such as from the steering wheel, or side posts or doors, impacting air bag to air bag. Also and importantly, the ventral space disposed in front of the body is reduced. This therefore, serves to fill the emptiness or void into which the body has a tendency to move during the type of impacts or emergency conditions described herein.

Other structural features of the additional preferred embodiments of the present invention include adjustable belt segments of a restraining harness, such as a horizontal chest belt segment thereof. The chest belt segment is operatively disposed in a substantially horizontal orientation from underarm to underarm in overlying, protective relation to the upper chest of the occupant. In addition, yet another structural modification of this preferred embodiment may include an additional or supplementary inflatable member mounted within a receptacle in the chest belt segment or other portions of the harness. When deployed the supplementary or additional inflatable member extends upwardly, underneath the chin area and is further dimensioned and configured to extend laterally about opposite sides of the neck. Therefore, there is a reduction in the forces of neck flexion and, perhaps, lateral flexion. The chest belt of the restraining harness segment therefore significantly reduces the lever arm action of the spine on the low back, almost to the point of elimination. Accordingly, since angular momentum is proportional to the length of the lever arm which sets the head in motion, the fulcrum of the lever arm is displaced from the low back to the base of the neck (C7 through T1 vertebrae). This makes the lever arm of the spinal column shorter. A shorter "lever arm" means smaller angular momentums which are translated into reduced forces of injury or possibly preventable injuries. This concept of restraint permits the possibility for using smaller airbags, thereby reducing costs. The horizontal restraint houses an under chin or submental airbag which restricts forward motion of the head and neck, while cushioning along with a headrest airbag for the posterior neck.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 16 is a side view in partial schematic demonstrating forces to which the occupant is exposed in a front and rear impact accident.

FIG. 17 is a top view in partial schematic of the embodiment of FIG. 16.

FIG. 18 is a side view in partial schematic demonstrating forces to which an occupant is exposed in a side impact accident.

FIG. 19 is a top view of the embodiment of FIG. 18.

FIG. 20 is a side view in partial schematic demonstrating forces and a range of motion to which an occupant is exposed in an oblique impact accident.

FIG. 21 is a top schematic view of the embodiment of FIG. 20.

FIG. 22 is a top view of various inflatable members strategically and globally mounted within the vehicle to protect an occupant from impact forces as demonstrated in FIGS. 16 and 17.

FIG. 23 is a top view showing additional inflatable members which are positioned within the vehicle to protect an occupant from impact forces as demonstrated in FIGS. 18 and 19.

FIG. 24 is a top schematic view disclosing the placement of a plurality of inflatable members collectively comprising an additional preferred embodiment of the present invention which protects the occupant from impact forces on the vehicle encountered from a number of different directions.

FIG. 34 is a top view in section and partial cutaway of yet another preferred embodiment of the restraining assembly of the present invention.

FIG. 35 is a sectional view in partial phantom of the embodiment of FIG. 34.

FIG. 36 is a side view of the embodiment of FIGS. 34 and 35.

FIG. 37 is a side view of the embodiment of FIGS. 34 through 36.

FIG. 38 is a front view of the embodiment of FIG. 37.

FIG. 39 is a top view of the embodiment of FIG. 38.

Like reference numerals refer to like parts throughout the several views of the drawings.

DETAILED DESCRIPTION OF THE PREFERRED EMBODIMENT

As shown in the accompanying drawings, the present invention relates to a restraint assembly designed primarily, but not exclusively, to protect occupants, generally indicated as 10, within a motor vehicle, generally indicated at 12.

Figure 1:
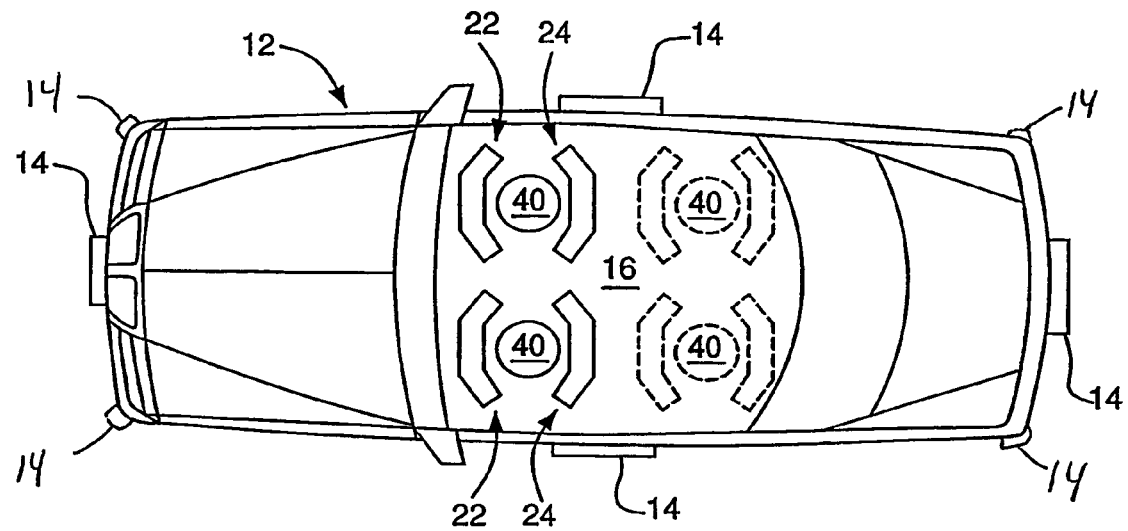
FIG. 1 is a top view of a vehicle showing interior portions and the general locations of plurality of cooperatively disposed inflatable members relative to an intended position of an occupant within the vehicle.
Figure 3:
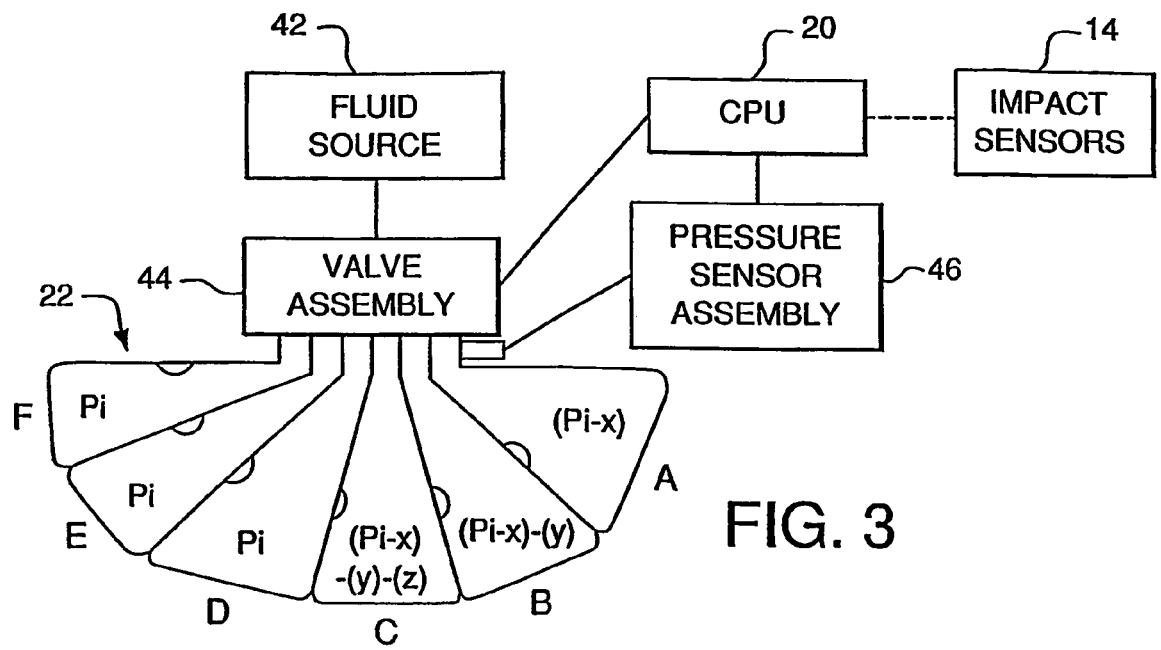
FIG. 3 is a schematic representation of a representative one of the inflatable members along with the operative components of the assembly causing its inflation and pressure regulation.

More specifically, and as shown in FIG. 1, the vehicle 12 is equipped with a plurality of impact sensors, as at 14, located at various positions on the vehicle, so as to sense the occurrence of an impact of sufficient degree to possibly cause harm to occupants within the passenger compartment 16 of the vehicle 12. The location of the impact sensors 14 in FIG. 1 is meant to be representative only of a plurality of locations where such impact sensors 14 could be positioned, the knowledge of which is possessed by persons of skill in the art relating to air bag deployment. In addition, and as shown in FIG. 3, the impact sensors 14 are operably connected and/or coupled to a computer processor, such as a micro-processing chip or other central processing unit (CPU) 20, incorporated within the vehicle 12 and responsive to the impact sensors 14 to the extent of activating one or more of the inflatable members, such as 22, 24, etc., incorporated within the restraint assembly of the present invention. As described below, the location of sensors at, at a minimum, the front, rear, two sides, and corners of the vehicle provides data which may be employed by a suitably programmed controller in the selection of inflatable members for inflation and the sequence of inflation. As shown in FIG. 1, an inventive feature of the present invention is the strategic location of the plurality of inflatable members in an operative position, relative to the plurality of intended positions 40 of the occupants. The intended occupant positions 40 are representative only since such positions may vary depending upon the size and configuration of the vehicle. Intended occupant positions 40 may also be referred to as occupant locations. It will be understood that occupant location refers to the location of any part of the body of an occupant; for example, restraints intended to restrain motion of an occupant's head are positioned in relation to, such as forward, rearward, and to one or the other side of, an occupant location.

Figure 2:
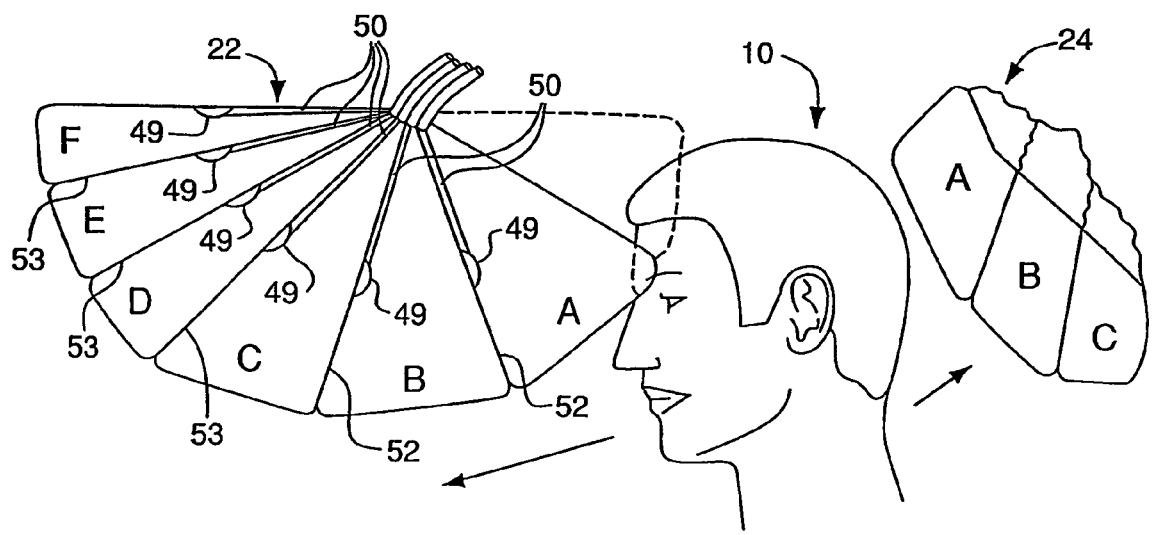
FIG. 2 is a schematic representation in partial cutaway of an occupant relative to two cooperatively disposed inflatable members.

With regard to FIGS. 1 and 2, one embodiment of the present invention includes inflatable members 22 and 24 located in substantially opposing relation to one another and in position relative to an occupant 10 to receive the repetitive and alternating "to-and-fro" motion resulting from the occupant's head (or other portions of the occupant's body) contacting a first inflatable member 22 and then, in a rebounding motion, contacting an intercepting, second inflatable member 24. For example, when a vehicle is involved in a head-on collision, the occupant's head 10 would initially be thrust forward and into a first, forwardly disposed inflatable member, such as 22 in FIGS. 2, 4 and 5, and would then rebound into a second, rearwardly disposed inflatable member, such as 24 in FIG. 2. Of course, if the impact were coming from the opposite direction, the occupant's head 10 could initially be thrust into the rearwardly disposed inflatable member 24 and then into the forwardly disposed inflatable member 22, and thus, the terms "first" and "second" or "forward" and "rearward" should not be construed in a limiting sense.

To assume the cooperative, substantially opposing relation of the first and second inflatable members 22 and 24 respectively, such inflatable members would optionally or preferably be mounted in the ceiling in a collapsed, stored position maintainable by pivotally attached cover members, which are forced open upon a pressurized inflation of the inflatable members 22 and 24. As will be explained in greater detail, particularly with reference to FIGS. 6 through 15, the inflatable members may be used independently of one another or in cooperative relation with one another and may be mounted at a variety of other strategic locations within the passenger compartment 16 in order to protect the occupant 10 from an impact occurring on or to the vehicle 12 from the front, rear, side, top, etc. Alternatively, the consumers may be given the option of equipping a vehicle with the number of minimally protective units, or the global unit, whichever they desire to purchase.

With primary reference to FIGS. 2 through 5, the structural and operational features of a single inflatable member 22 will now be described. It is pointed out, however, that each of the inflatable members, whether working independently of one another or in cooperative relation to one another, as explained with reference to FIG. 2, have a substantially equivalent structure and operation. Accordingly, the inflatable restraint assembly the invention of present invention comprises a fluid source 42 which may include one or a plurality of sources of air, gas, gel, or other inflatable fluid material, wherein each of the plurality of inflatable members, such as 22 and 24, or such as 26 and 28 shown in FIGS. 7 and 9, may be connected in fluid communication with a separate fluid source or different, independent fluid sources. In addition, a valve assembly 44 is operatively connected with each of the inflatable members 22 so as to regulate flow to and from the interior thereof, in a manner to be described in greater detail hereinafter. Also, a pressure sensing means, preferably comprising a pressure sensor assembly 46, is associated with each of the inflatable members 22, 24, 26, 28, etc. in a manner which serves to sense the pressure in various portions or zones on the interior thereof and relay such sensed pressure to the processor or CPU 20. The CPU 20 controls and activates the valve assembly 44 to actively regulate and/or vary the pressure between the various portions or zones of each of the inflatable members, as will be explained.

Each of the inflatable members is defined by a multi-chamber construction wherein, in the specific embodiment shown in FIGS. 2 through 5, a first plurality of internally disposed chambers A, B, and C define an "impact absorption zone" which is located generally on what may be termed a leading portion of the inflatable member 22. A second plurality of chambers D, E, and F may define what is referred to as an "impact resistance zone" and are located on a trailing portion of the inflatable member 22, relative to the direction of travel or motion of the occupant 10 when engaging the inflatable member 22, during an accident. It is emphasized that the number of chambers in the impact absorption zone as well as the impact resistance zone may vary, and further, that the number of chambers in each zone may differ from one another. The sensor assembly 46 is specifically structured to sense the pressure within each of the aforementioned chambers A, B, C, D, E, and F and may comprise a plurality of individual sensors 49 connected by appropriate wiring 50 to a printed circuit board or like controller mechanism (not shown) incorporated within the sensor assembly 46, which in turn, is connected to the processor or CPU 20. It is to be emphasized that a variety of other individual sensor structures, other than 49 may be incorporated and operative to perform the primary function of sensing the pressure within each of the individual chambers A, B, C, D, E, and F in relaying such sensed or determined pressure back to the controller incorporated within the main body of the sensor assembly 46. Pressure sensors at outlets of the anterior chambers and inlets of the posterior chambers are acceptable alternatives on options to airbag wall sensors, since, in a fluid system, pressure is exerted equally in all directions.

Each of the adjacent chambers are at least partially segregated from one another by an appropriately positioned partition 52 or 53. More specifically, each of the partitions 52 serves to at least partially segregate the internal chambers A, B, and C of the impact absorption zone and include an apertured construction in order to allow at least some fluid flow there through. This embodiment serves to facilitate a partial collapse or deflation of the impact absorption zone by allowing the fluid to be forced from chamber A to chamber B and eventually to chamber C, where it then may flow out, from the chambers of the impact absorption zone through the valve assembly 44. Conversely, the partitions 53 serving to separate the various internal chambers of the impact resistant zone from one another, as well as the chamber C from the chamber D, do not have any type of apertured construction and are, therefore, structured to define total segregation and to not permit air flow to pass between the chambers D, E and F, of the impact resistance zone, for reasons which will be made clear upon further description set forth hereinafter. The valve assembly 44 serves to regulate fluid flow into and out of each of the internal chambers A, B, C, D, E, and F and may take a variety of configurations, which are structurally and operationally capable of independent flow into and out of the individual chambers A, B, C, D, E, and F, as well as the selective maintenance of the pressure within certain ones of the chambers and deflation of certain others of the plurality of chambers.

The workings of the one or more inflatable members 22, 24, etc., independently or in combination with one another, and the gradient pressure differential between the various internal chambers A, B, C, D, E, and F in particular, will now be explained. The term "gradient pressure differential" is meant to include the difference in pressures between each of the chambers of the inflatable members specifically wherein some of the internal pressures of various ones of the chambers are greater than in others. Accordingly, for purposes of explanation, the initial inflation pressure will be represented as Pi and will also be equal to the pressure within the second plurality of chambers D, E, and F, defining the impact resistance zone of each inflatable member 22. The pressure in chamber A, being the first or leading internal chamber of the impact absorption zone, is maintained lower than the initial inflation pressure Pi, by an increment of pressure represented as (x). Therefore, the total pressure in chamber A before the force of impact of the occupant with that inflatable member may be expressed as (Pi−x).

The pressure in chamber B will be lower than the pressure in chamber A and accordingly lower than the pressure Pi maintained in chambers D, E, and F. In relationship to chamber A, the pressure in chamber B will be lowered by a value (y) and may be expressed as (Pi−x)−(y).

The pressure in chamber C will be lower than that in chamber B by a value (z). Therefore, the pressure in chamber C may be expressed as (Pi−x)−(y)−(z).

Accordingly, it should be seen that the collective pressure in chambers A, B, C, is lower than the pressure Pi maintained in chambers D, E, and F.

In operation, the force of impact of an occupant 10 on an inflatable member 22 causes a transfer of pressure from chambers A to B to C, and if pressure within these chambers is excessive, beyond a certain threshold point which may threaten the integrity of the structure of he inflatable member 22, an out-flow of air through the valve assembly 44 occurs. The sensor assembly 46 summates the transmission of pressure forces, expressed as a change of pressure, while chambers D, E, and F provide initial resistance to the force of impact of the occupant 10. The processor 20 then "reads" the force of impact of the occupant that needs to be opposed and rapidly deploys a discharge of air from the fluid source 42 to the chambers D, E, and F. As set forth above, chambers D, E, and F do not communicate with one another so that disruption of the integrity of one chamber, due to shear forces or tearing, will not compromise the function of the entire inflatable member 22. This rapid deployment of air into chambers D, E, and F, occurs in a rapid succession of increments, creates an equal and opposite force to the force of impact, but not a greater force than the force of impact, so as to provide an active opposition to and correction of the force of impact of the occupant. This correction serves to slow the acceleration-declaration of the occupant, as well as the occupants range of motion. This, in turn, reduces the momentum upon the body part of the occupant 10 contacting the inflatable member 22, and further reduces successive to-and-fro motions to lesser oscillations of motion of the occupant.

By way of further explanation, the summate pressure within the inflatable member 22, upon the occurrence of a first force of impact of the occupant is expressed as P1. In terms of the pressures within the various chambers, the summate pressure P1 is more specifically postulated, conceptually, to be P1=(Pi)+(Pi−x)+((Pi−x)−(y))+((Pi−x)−(y)−(z))+E, where E represents the external force of acceleration of the occupant. The processor 20 arrives at P1, reads the difference between P1 and the pressure Pi, and incrementally adds the amount of air needed to in-fill chambers D, E, and F, to meet and oppose this summate pressure, P1. This rapid inflation, followed by rapid deflation of the chambers D, E and F, back to pressure Pi, restores the unit to base line to receive the next impact. That summate pressure information is then transmitted by the processor 20 to the opposing, cooperatively positioned inflatable member 24 (see FIG. 2), generally to the unit placed 180° opposite of the initiating unit, to provide an opposing force at least equal but not less than the previous opposing force and reduced by an increment to be determined, so that the summate pressure is not greater than the force impact of the occupant. As a result, a lower total summation pressure, P2 of the inflatable member 24 is provided as compared to P1 of the inflatable member 22. Repeated impacts will register successive summation pressures of alternating, interceptor inflatable members 22 and 24 as P3, P4, P5, etc. wherein each successive total summation pressure and opposition-corrective pressure will probably be successively lower than the preceding pressure, because of reduced inertia, active opposing pressure forces by the inflatable members 22, 24, and the coefficient of air friction, all coming into play.

Figure 4:
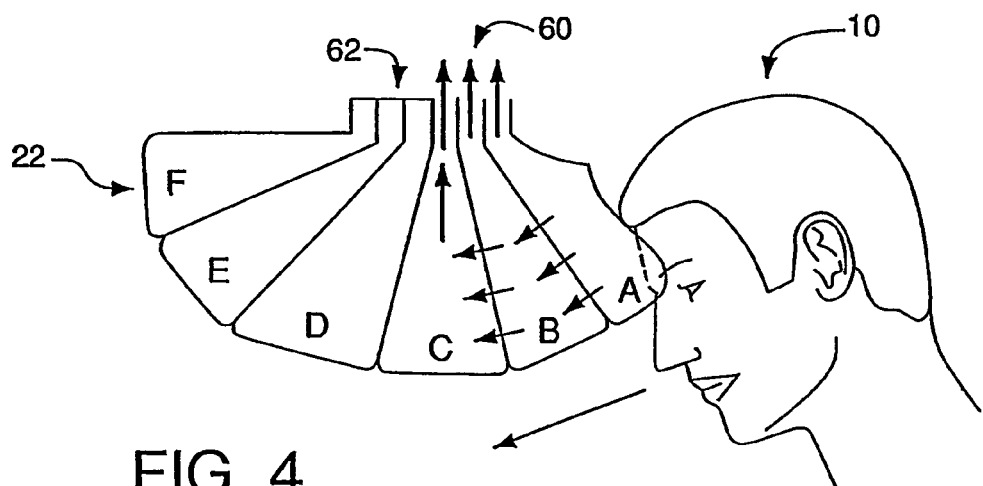
FIG. 4 is a schematic representation of the inflatable member of FIG. 3 and a forwardly directed impact caused by accelerated-decelerated forces acting on the head and neck of an occupant.
Figure 5:
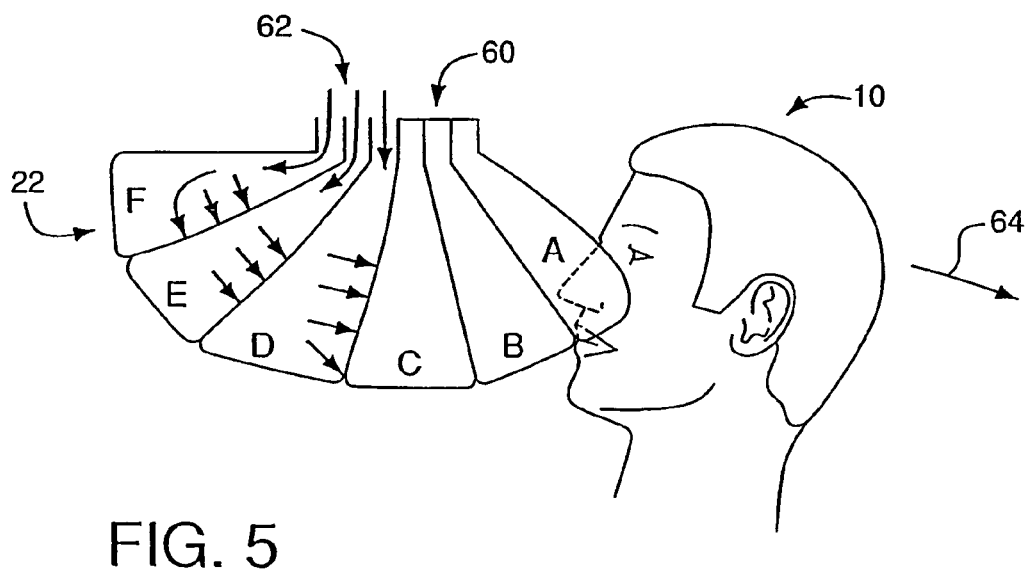
FIG. 5 is a schematic representation of the inflatable member of FIGS. 3 and 4 in another sequence corresponding to a rebounding movement of the occupant's head and neck in an opposite, rearward direction.

With reference to FIGS. 3, 4 and 5, the occupant 10 engages the inflatable member 22 at a first chamber A, which is the leading portion of the impact absorbing zone. The pressure in chambers, A, B, and C begins to reduce through a transfer of air from chamber A to chamber B and from chamber B to chamber C and eventually, through the valves 60, which are now open. At this point the valves 62 associated with the chambers D, E, and F of the resistance zone are maintained in a closed position, due to activation and control by the processor 20. It should be apparent, therefore, that in reaction to the force of impact of the occupant 10 with inflatable member 22, the impact absorption zone will serve to absorb a portion of the force of impact while the pressure within chambers D, E, and F will be initially maintained at the same pressure, Pi. Therefore, chambers D, E, and F will present a resistance force, and thereby, serve to define the impact resistance zone of the inflatable member 22. However, as shown in FIG. 5 the processor 20 "reads", through operation of the sensor assembly 46, the force of impact of the occupant 10 on the inflatable member 22, and thereby, determines the amount of pressure required to oppose this force of impact and incrementally increases the pressures within the chambers D, E, and F of the impact resistance zone in order to make the summation of forces P1, within the inflatable member equal to, but not greater than, the force of impact of the occupant 10 engaging the inflatable member 22. In order to accomplish this, the valves 60 into chambers A, B, and C are closed, whereas the valves 62 are opened to allow for the immediate and rapid inflow of air for purposes of the aforementioned incremental increase in pressure. This rapid deployment of air discharged into chambers D, E, and F occurs in an increment to create an equal and opposite force, but not a greater force than that of the force of impact of the occupant 10 engaging the inflatable member 22. A creation of a greater force is prohibited in that such an excessive force created in chambers D, E, and F would "re-accelerate" the head or other body part, possibly causing further damage or injury to the occupant 10 by rebounding in the opposite direction as indicated at 64.

When the two or more inflatable members 22 and 24 are working in cooperative relation to one another, in that they are substantially opposed as shown in FIG. 2, the motion indicated as 64 will be a rebounding motion. The occupant will be intercepted by the second inflatable member 24, which will react in the same manner in terms of actively regulating or varying the pressure in the various chambers A, B, and C of the impact absorption zone, as well as the internal chambers D, E, and F, of the impact resistance zone as to provide a lesser summate pressure P2, set forth above. The rebounding force with which the occupant 10 engages the second inflatable member 24 will be calculated almost instantaneously by cooperative workings of the sensor assembly 46 and the processor 20 so as to regulate and determine the initial inflation pressure Pi of the chambers D, E, and F of the impact resistance zone of inflatable member 24 and based on the initial inflation pressure Pi, the pressure of the remaining internal chambers A, B, and C of the impact absorption zone will also be incrementally determined and adjusted such that absorption and resistance is accomplished in an optimum manner so as to reduce the motion of the occupant's head, or other body part, to lesser oscillations. Computer software can be written to cause processor 20 to carry out the necessary calculations and provide suitable instructions.

Figure 6:
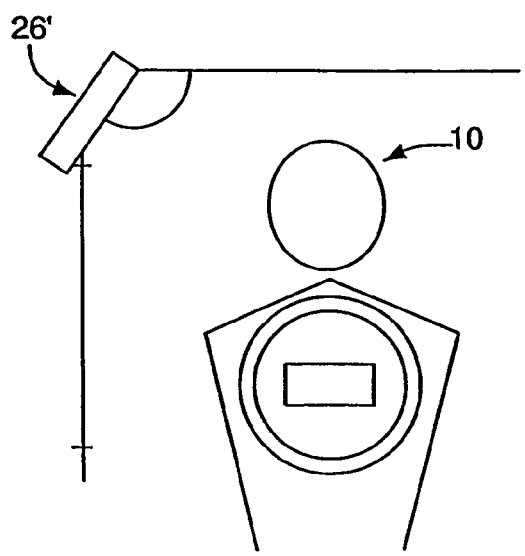
FIG. 6 is a schematic representation of one preferred location of an inflatable member in accordance with the present invention.
Figure 7:
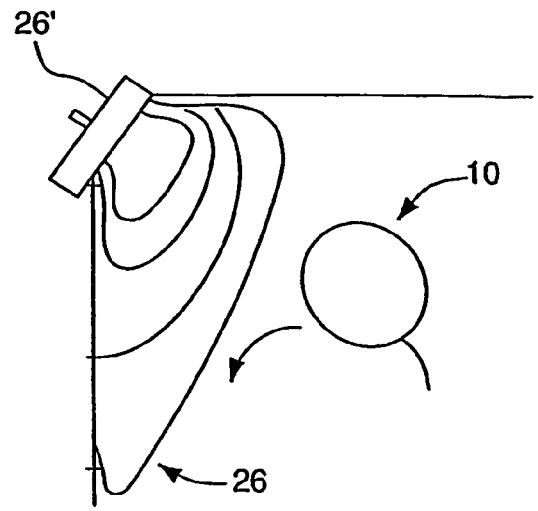
FIG. 7 is a schematic representation of the embodiment of FIG. 6 with the inflatable member in a deployed position.

As shown in FIGS. 6 and 7, one strategic location of at least one inflatable member 26 may be in an upper side corner within a compartment 26' above or adjacent to a door or window opening. When inflated in the manner shown in FIG. 7, the inflatable member 26 will be disposed adjacent to the window, so as to protect the occupant 10 from impacting the window or door.

Figure 8:
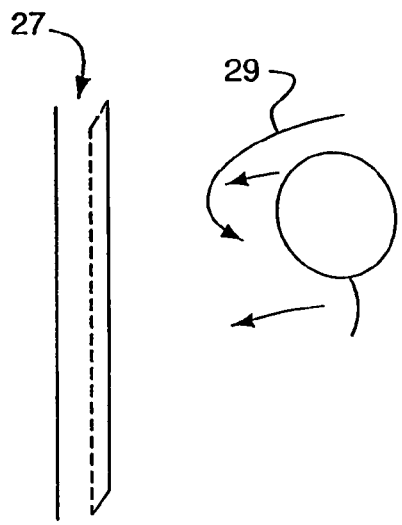
FIG. 8 is a schematic representation of another preferred location of at least one inflatable member of the present invention.
Figure 9:
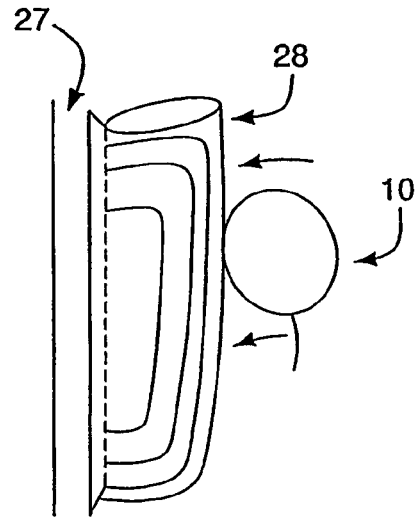
FIG. 9 is a schematic representation of the embodiment of FIG. 8 with the inflatable member being deployed.

Similarly, in FIGS. 8 and 9 an inflatable member 28, including the plurality of internal chambers as indicated above, may be mounted in its stored position within a door post 27 and, when inflated, may extend outwardly therefrom so as to protect the occupant 10 from engagement with the door post, window or other portions of the door and thereby reduce or eliminate lateral-flexion which causes the aforementioned injuries. In this manner, a resulting rotation of the occupant 10 as indicated by directional arrow 29 may also be eliminated by engagement with the deployed inflatable member 28.

Figure 10:
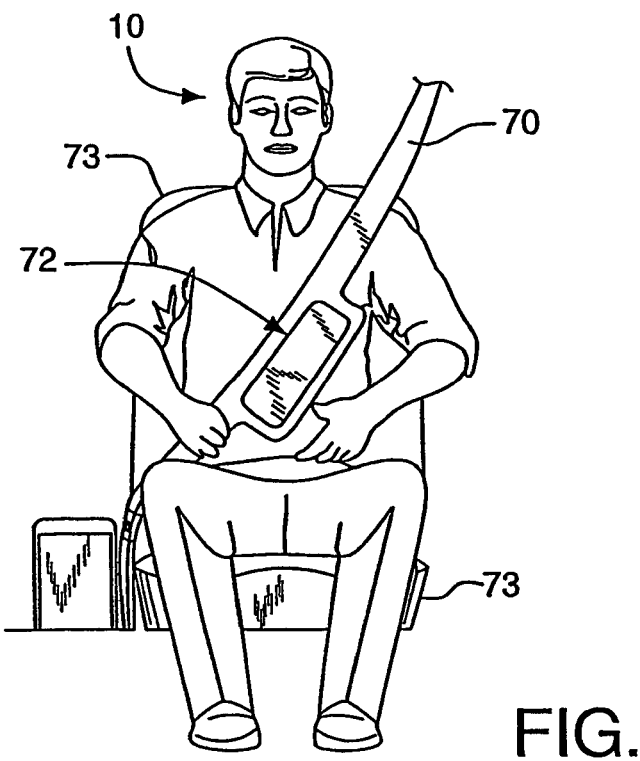
FIG. 10 is a front view of an inflatable member in accordance with the restraint assembly of the present invention mounted on a restraining harness.
Figure 11:
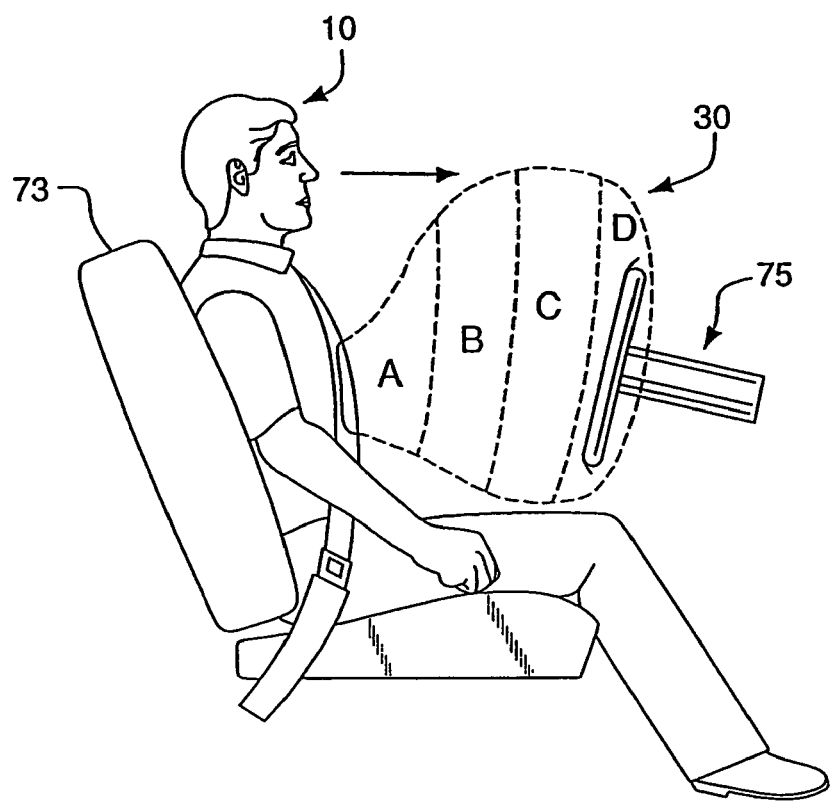
FIG. 11 is a side view of the embodiment of FIG. 10 shown partially in phantom lines indicating a deployment of the inflatable member.
Figure 12:
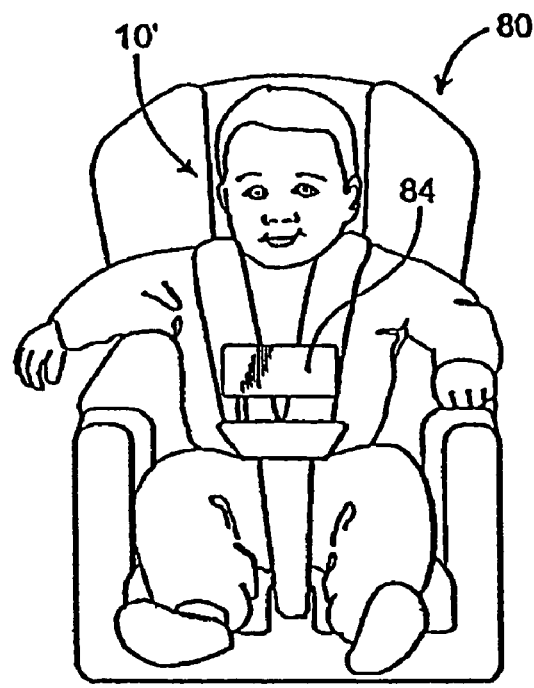
FIG. 12 is a front view of another embodiment of the present invention wherein at least one inflatable member is mounted on an auxiliary seat, such as a child's seat.

With reference to FIGS. 10 and 11, at least one of the inflatable members 30 may be mounted on a harness 70, which extends across the occupant's body in the conventional manner. The compartment 72 for the inflatable member 30 is mounted such that when deployed, the inflatable member 30 is projected outwardly, away from the occupant 10, when the occupant is in an intended position, such as a seat 73. The inflatable member 30 once deployed may engage the steering wheel airbag generally indicated as 75 or other portions of the vehicle, dependent upon the location of the seat and the intended position of the occupant 10. Just as with the diagonal seat belt airbag discharging forward, and away from the driver to impact, airbag-to-airbag with the steering wheel airbag, similar smaller airbag units may be mounted at other locations in the vehicle interior, such as sideways at both ends of the lap belt to impact, airbag-to-airbag, with the window-door unit or between occupants. Airbag-to-airbag deployment eliminates dead space for motion, restricts momentum and cushions the body.

Figure 13:
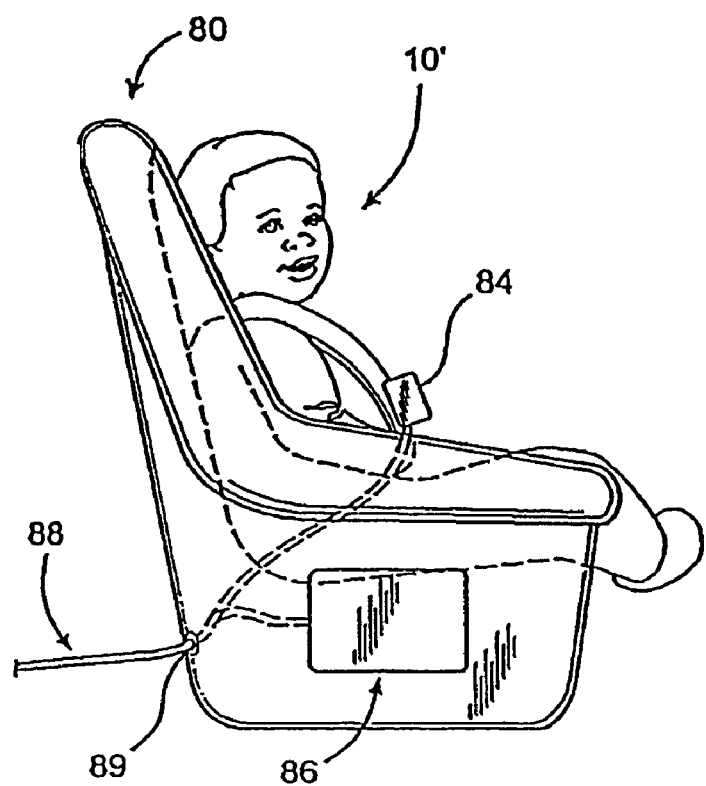
FIG. 13 is a side view of the embodiment of FIG. 12.
Figure 14:
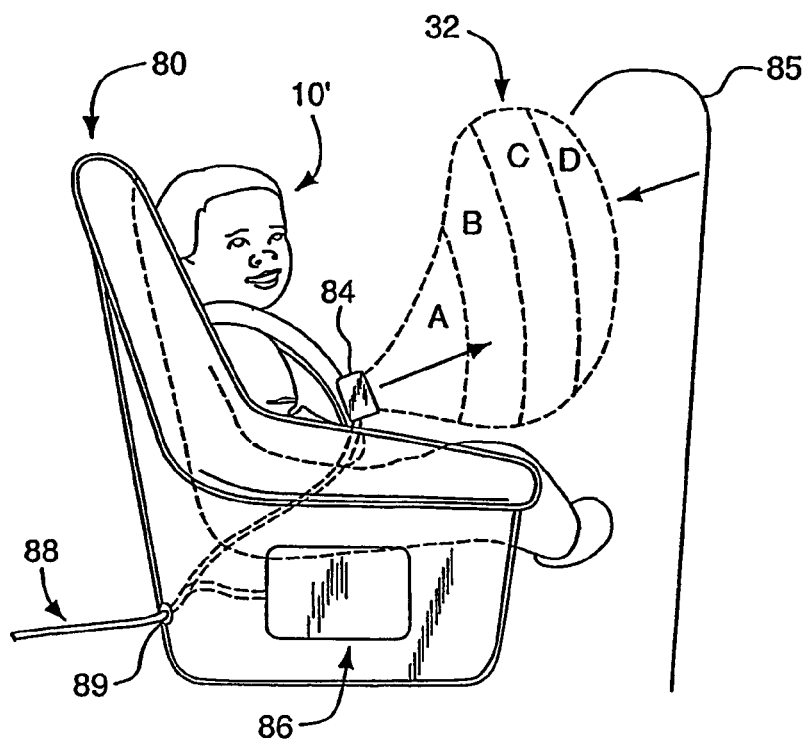
FIG. 14 is a side view of the embodiments of FIGS. 12 and 13 shown in partial phantom lines representing a deployment of the inflatable member.

With regard to FIGS. 12 through 15, the one or more inflatable members 32 and 34 can be mounted on and deployed directly from an auxiliary seat 80, which may be in the form of a child seat or other auxiliary seat. The inflatable member 32 can be stored within a harness or other component or portion of the auxiliary seat 80, as at 84, so that when it is deployed it extends outwardly away from the occupant 10', as shown in FIG. 14, into engagement with a seat back surface 75 or other portion of the vehicle, dependent upon the orientation and location of the auxiliary seat 80. Similarly, a second or additional inflatable member 34 can be deployed outwardly from a side area, as at 86, of the auxiliary seat 80, into engagement with a side portion of the vehicle in order to prevent injury from a side impact of the vehicle.

Figure 15:
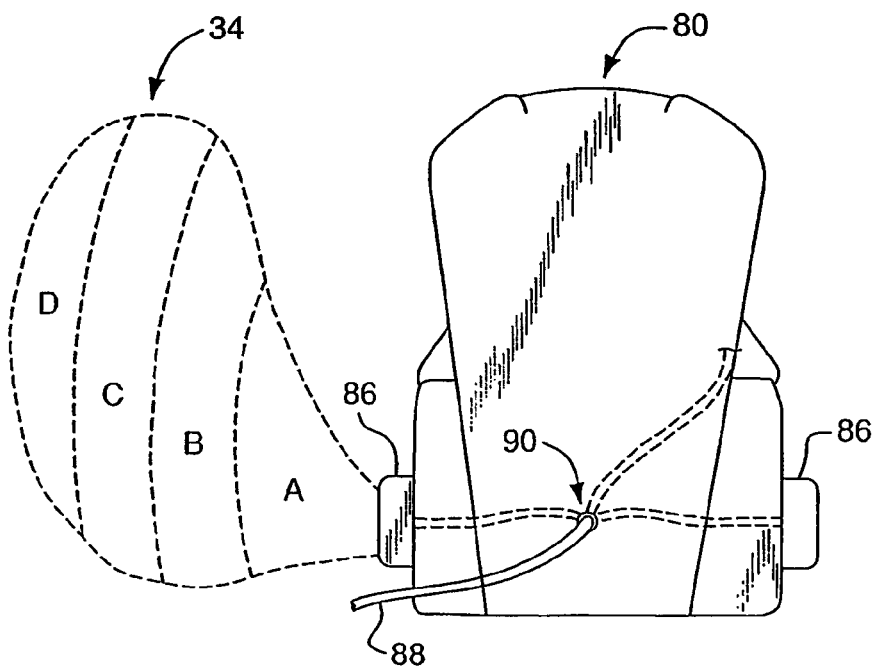
FIG. 15 is a rear view of the embodiment of FIGS. 12 through 14 showing a deployment of another inflatable member being mounted on the side of the auxiliary seat and represented in phantom lines in a deployed position.

FIGS. 13 and 15 also indicate that the inflatable members 32 and 34 may be electrically and/or pneumatically interconnected to the processor 20 and/or to one or more fluid sources of inflatable material, such as air, by a cord or cable assembly 88, running through appropriate mountings and/or apertures 89 and 90, formed on the auxiliary seat 80.

Yet additional preferred embodiments of the present invention are herein demonstrated in FIG. 16 through 58. As described, the restraint assembly associated with these embodiments are disposed, dimensioned and structured to overcome the many different types of forces to which the human body of an occupant may be subjected when seated within a vehicle involved in an emergency condition. It is therefore again emphasized that some injuries to an occupant are due more to linear momentum and deceleration forces while others are due to angular momentums with deceleration forces. In addition to these forces, the occupants may be subjected to a combination of torque forces, centrifugal and centripetal forces, and "crunch" forces due to spinal loading. All of these forces are summated by the time appropriate ones of the plurality of inflatable members are deployed. Accordingly, most belt restraints and air bags, as known in the prior art, can do little but passively absorb the forces to which the body is subjected. When such summated forces are greater than the ability of the human body to tolerate, tissue deformation occurs with resultant injury.

As shown in the accompanying drawings, and with specific reference to FIG. 16 through 24, it is schematically demonstrated that an occupant of the vehicle generally indicated as 100 and disposed in a seated position on vehicle seat 101 is exposed to forces during a collision of the vehicle from both the front 102 and the rear 106. As such, the spine of the occupant acts as a long lever with the fulcrum at the lumbar junction with the pelvis 104. The forces influencing the body of the occupant 100 causes the large angular momentum of the head on the spine with large anterior/posterior "whipping" action. Forces of linear acceleration are superimposed and summated with those of angular momentum and torque, wherein the linear forces are represented by the directional arrow 105. For purposes of reference, the occupant 100 is oriented to face in a forward direction 107 and is seated next to a side or window area 108.

With reference to FIGS. 18 and 19, the spine of the occupant 100 flexes laterally from side-to-side further serving to whip the head towards and away from the side window 108. This is the result of an impact from a lateral or side direction such as on the door or side panel 111 of the vehicle 112 as indicated in FIG. 18. The phantom lines of the occupant's head indicates lateral hyperflexion from side-to-side.

FIGS. 20 and 21 represent schematic side and top views respectively for the purpose of demonstrating the reaction on the occupant 100 upon the occurrence of an emergency event or accident involving oblique impacts 116. Such oblique impacts introduce an element of torque-rotation to the head and spine superimposed on the large angular momentum forcing them into what may generally be referred to as a "conical" range of motion generally indicated as 114. As such, the direction of force from the oblique impacts produce the conical range of motion, wherein the apex of the conical range is generally defined at the lumbosacral junction of the spine with the pelvis 104 as set forth above. The head of the occupant 100 is moved through an arc of angular momentum and again the forces are summated.

As will be explained in greater detail hereinafter, FIGS. 22 through 24 disclose various additional preferred embodiments of the restraint assembly of the present invention which are disposed, dimensioned, and configured for timely activation, by operation of the processor assembly 20 and operatively associated impact sensors as at 14. The various components of the restraint assembly, to be described, serve to protect the one or more occupants 100 from the various linear, angular or torque forces exerted on the body of the occupant 100, dependent upon the direction of impact on the vehicle involved in an emergency event or crash.

Figure 25:
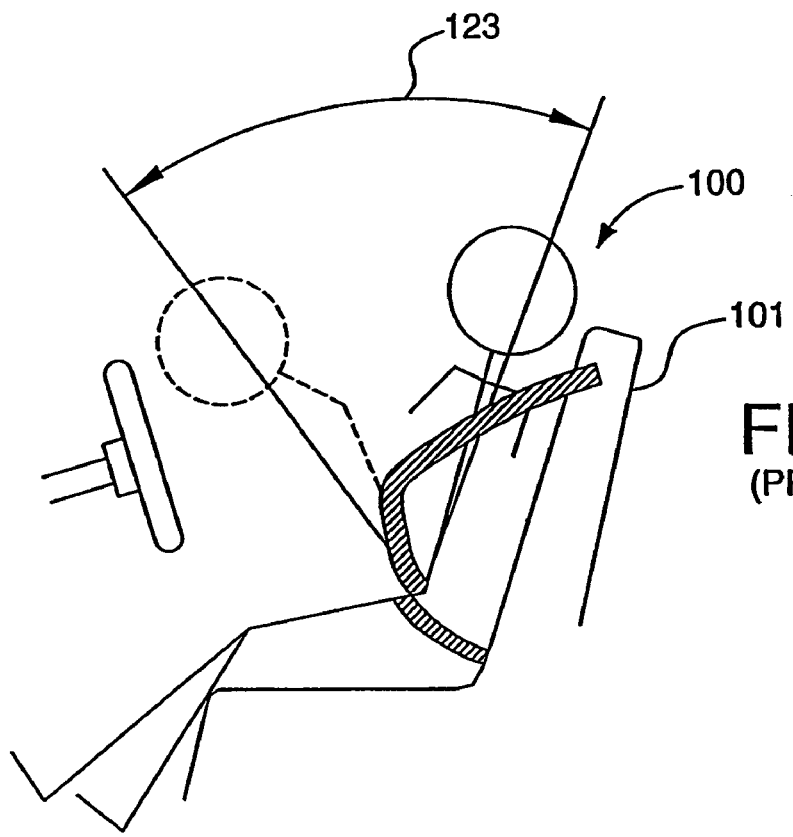
FIG. 25 is a side view in schematic form showing forces which are applied to the body in an emergency condition including impacting the vehicle in which an occupant is riding.
Figure 26:
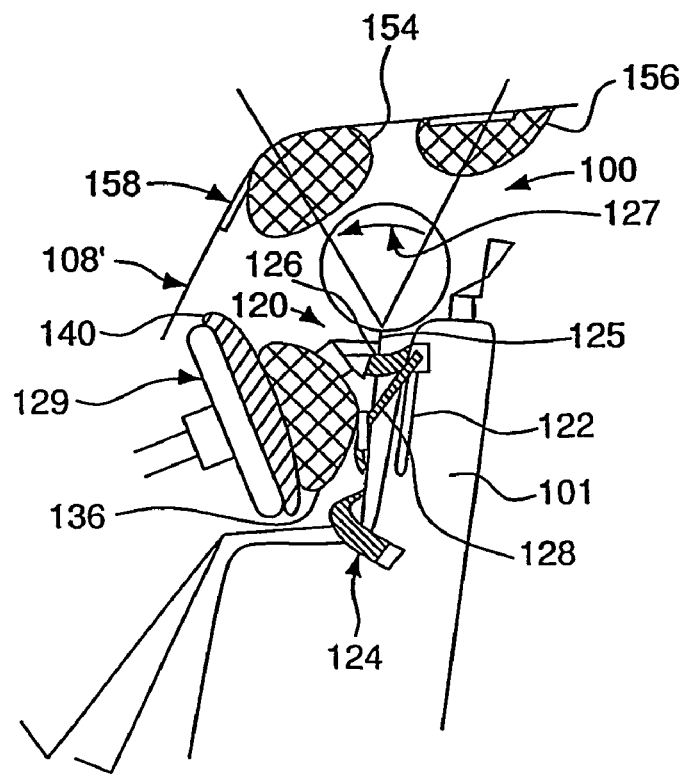
FIG. 26 is a side view in schematic form of another preferred embodiment of the restraint assembly of the present invention protecting the occupant's body from the forces as explained with reference to FIG. 25.

Accordingly, as shown in FIGS. 25 through 33 the restraint assembly of the present invention comprises a restraining harness generally indicated as 120 secured to a vehicle seat 101, at least in part, by a mounting assembly generally indicated as 122, to be described in greater detail hereinafter. FIGS. 25 and 26 further demonstrate that the long lever defined by the length of the spine, provides an extended whipping action resulting in large angular forces of deceleration superimposed on linear forces of deceleration. The summation of these forces of course increases the high tendency of trauma or fatality. The increased magnitude of such forces is indicated by the extended forced movement 123 of the occupant 100 in the event that an inadequate restraining harness was used instead of the restraining harness 120 of the present invention. However, using the restraint harness 120 of the present invention and further incorporating a plurality of globally disposed inflatable members, all actuated on a timely basis by the processor assembly 20, the fulcrum of motion is located at the base of the neck 125, resulting in a significantly decreased arc of angular momentum 127.

This reduced angular momentum is directly attributable to the structuring of the restraint harness 120 which includes a lap belt segment 124, an upper chest belt segment 126 and a diagonal belt segment 128 in a "Z" configuration when viewed from the front, which deploys away from the body to reduce risk of injury. Therefore, the restraint harness comprising these cooperatively structured and combined belt segments result in a protection of the occupant 100 in a manner which significantly reduces the angular momentum, as at 127, as well as any torque forces of the head on the neck and of the chest due to a twisting action, again dependent on the direction of impact. For purposes of orientation the occupant 100 is facing towards the front windshield 108' and in FIG. 26 is represented as an operator or driver of the vehicle positioned in front of the steering wheel generally indicated as 129. Harness 120 is shown in an occupant restraining position in FIG. 26. In general, any harness described in this application is in an "occupant restraining position" when properly positioned and secured relative to an intended occupant location or occupant position. The restraining harness assembly 120 and specifically the positioning and operation of the diagonal belt segment 128 reduces lateral flexion of the spine and reduces lateral and rotational momentum towards the side window 108 and the door post 109. Impact forces are further reduced and opposed by a plurality of the other inflatable members to be described in greater detail hereinafter.

Figure 27:
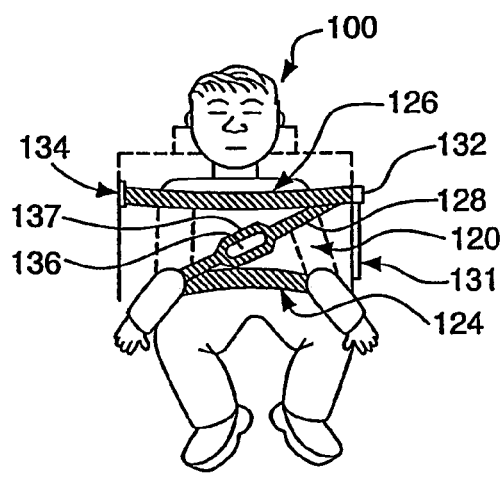
FIG. 27 is a front view of another preferred embodiment of the restraint assembly of the present invention including a restraint harness.
Figure 29:
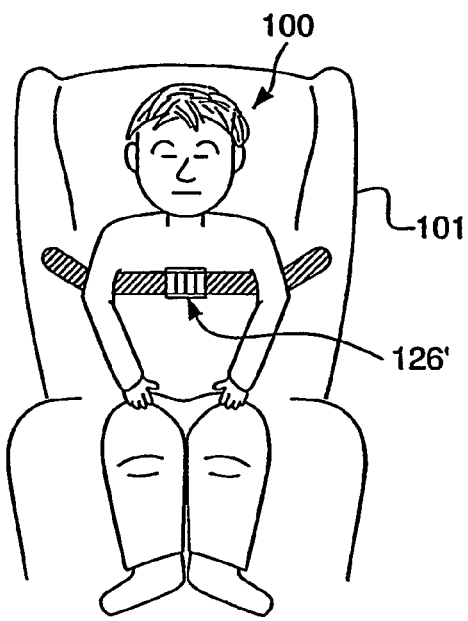
FIG. 29 is a front view of yet another preferred embodiment of the restraint assembly of the present invention.
Figure 28:
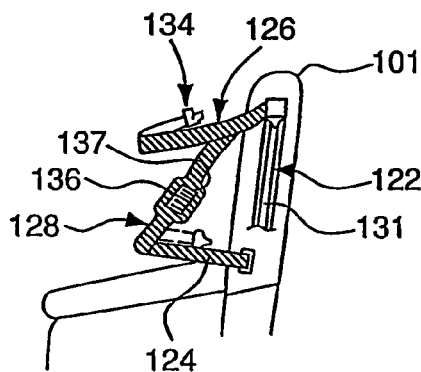
FIG. 28 is a side view of the embodiment of FIG. 27.
Figure 30:
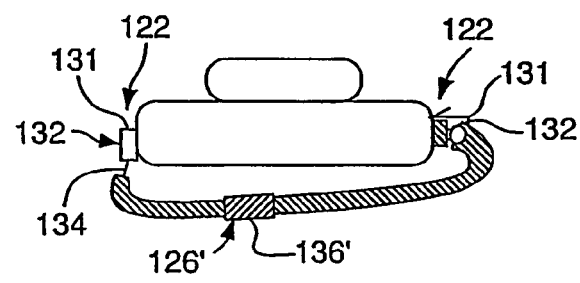
FIG. 30 is a top view of the embodiment of FIG. 29.

With further reference to FIGS. 27 through 33, the restraining harness 120 of the present invention comprises the aforementioned belt segments 124, 126 and 128. As best shown in FIGS. 27 and 28, (as well as FIG. 53), the belt segments are collectively oriented or disposed in a substantially "Z-shape" configuration when in their operative, restraining position. In particular, FIGS. 29 and 30, show details of the chest belt segment 126' disposable in overlying relation initially or preferably to the upper chest area of the occupant 100 so as to able to fit beneath the occupant's arms and underneath the shoulders. Opposite ends of the chest belt segment 126, 126' are connected to opposite or corresponding sides of the seat 101 in both the embodiment of FIGS. 27 and 29 by virtue of the aforementioned mounting assembly 122. The mounting assembly 122 comprises an elongated track 131, wherein each opposite end of the chest belt segment 126 includes an appropriately configured anchor member 132 of the type shown in FIG. 31. The anchor member 132 is selectively positionable along the length of the track 131 and lockable, by interaction between the track 131 and the anchor member 132 into the selected position along the length of the track 131. Both sides of the seat 101 include an attachment of the mounting assembly 122 thereto, including the elongated tracks 131.

In addition, the chest belt 126 and/or 126' has a buckle member as at 134 secured to at least one end thereof so as to facilitate removable attachment of the chest belt 126, 126' in the aforementioned overlying relation to at least the frontal area of the occupant 100. Accordingly, the anchor member 132 may be attached or connected to the belt buckle such that both the belt buckle and the anchor member are movable along the length of the corresponding track 131. The adjustability of the chest belt 126 is for purposes of accommodating occupants 100 of varying sizes ranging from children to large adults, while still providing the needed protection. Therefore, the aforementioned Z-shape configuration of the belt segments 124, 126 and 128 is more specifically defined by the chest belt 126 and the lap belt 124 being disposed in somewhat horizontal orientation, respectively overlying the chest and lap portions of an occupant. In cooperation therewith, the diagonal belt 128 extends from generally one end of the chest belt 126, with which it may be connected, diagonally across the occupant to an oppositely disposed end of the lap belt 124 and is preferably independently adjustable.

Another preferred embodiment associated with the restraining harness 120 is the provision of least one inflatable member 136 mounted thereon. In the embodiments of FIGS. 27 and 28 the inflatable member 136 is mounted, in a stored position, within a chamber like structure 137. However, when inflated, as shown in FIG. 26 the inflatable member 136 is disposed and structured to extend outwardly away from the harness 120 and also away from the frontal area of the occupant 100. The one inflatable member 136 is further disposed in aligned relation to the steering wheel 129.

Accordingly, an additional inflatable member 140 may be mounted on the steering wheel 129 and the inflatable members 136 and 140 are cooperatively disposed and structured to be forced into confronting relation to one another to further reduce the angular momentum 127 upon the occurrence of an emergency event, as described above. The details of the inflatable member 140 will be discussed at greater length with regard to FIGS. 46 through 48.

In addition the above, yet another feature of the present invention is the provision of the one inflatable member, herein designated 136' located within the chest belt 126', as disclosed in FIG. 29. As with the embodiment of FIG. 27, the activation of the inflatable member 136' is such that it extends outwardly into an operative orientation away from the chest belt segment 126' and the occupant 100 so as to engage a frontal portion of the automobile when the occupant 100 is not the driver. Naturally, as with the embodiment of FIG. 26, the inflatable member 136' when inflated into its operative orientation, confrontingly engages and cooperates steering wheel inflatable member 140 as described.

Figure 32:
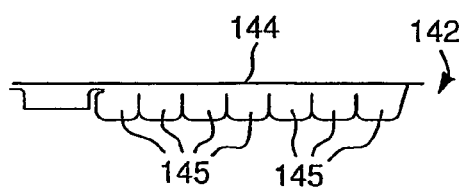
FIG. 32 is a top view of one or more belt segment structures associated with the restraining harness of the embodiments of FIGS. 27 through 30.
Figure 33:
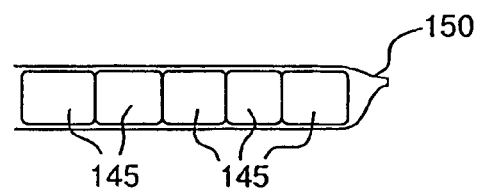
FIG. 33 is a front view of the embodiment of FIG. 32.
Figure 31:
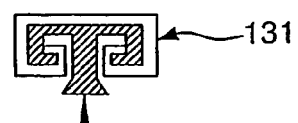
FIG. 31 is a detailed view in section showing a mounting assembly associated with the restraint assembly of the embodiments of FIGS. 27 through 30.
Figure 40:
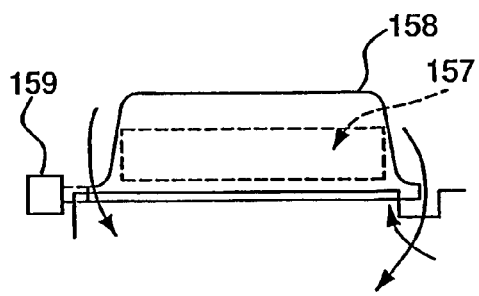
FIG. 40 is a front view of an interior of a vehicle showing the stored location of one of a plurality of inflatable members included in the restraint assembly of the present invention.

With reference to FIGS. 32 and 33, both the embodiments of FIGS. 27 and 29 may also include additional structural features which facilitate the comfort and safety of the occupant 100 and eliminate any type of exposure or trauma to the chest, neck or other portions of the user's body. As emphasized, injury and trauma is reduced through the reduction of deceleration/momentum of upper body forward motion, thereby reducing deceleration of the head and neck. To accomplish this, one or more of the belt segments 124, 126, 126' and 128 may include an inflatable section generally indicated as 142. The inflatable section 142 extends outwardly from the surface 144 which confronts the occupant (not shown) and may comprise at least one, but preferably, a plurality of inflatable air chambers 145 of sufficiently reduced dimension to be mounted on one or more of the belt segments. The air chambers 145 are disposed substantially on the interior of the various belt segments, collectively indicated as 150 in FIG. 33 for purposes of clarity. The one or more air chambers 145 are inflatable upon a sensing assembly 14 determining the existence of an emergency event or impact and also substantially concurrently to the inflation of the remaining inflatable members of which the restraining assembly of the present invention is at least partially comprised.

With reference to FIGS. 34 through 39, yet another preferred embodiment of the present invention comprises structural modifications of the harness assembly 120, and more specifically, the chest belt segment 126, 126'. In situations where the inflatable member 136 is mounted in the diagonal belt segment 128, the chest belt segment 126, 126' may include an additional inflatable member generally indicated as 142. The inflatable member 142 is mounted within an area or compartment 144 having a removable cover member 143. The cover member 143 is disposed in covering or closing relation to the chamber 144 when the inflatable member 142 is in its stored position. As stored, the inflatable member 142 includes two outwardly extending lateral or end portions 145 disposed in folded or overlapping relation to a central portion 146. The lateral or end portions 145 are folded into the overlapped position along designated fold lines 147 and 147' as indicated in FIGS. 37 and 38. The cover member 143 may pivot outwardly or be displaced in any other applicable direction relative to connection 143' in order to allow the inflatable member 142 to extend outwardly from the chamber 144 into an inflated, operational orientation as shown in FIGS. 36 through 39.

First, and with reference to FIG. 36, upon activation, the closure 143 is opened or displaced and the inflatable member 142 extends outwardly into its inflated, operable orientation As shown in FIG. 37, the inflatable member 142 is such as to extend in front of the neck or throat area 100' of the occupant 100 immediately beneath the chin area 149. Further, the lateral or end portions 145 are dimensioned, configured and disposed relative to the central portion 146 to extend in overlying, protective relation to opposite sides of the throat or neck, as clearly demonstrated in FIGS. 37 through 39. Accordingly, when in its fully inflated position the throat and sides of the neck are completely protected as the inflatable member 142 wraps laterally around the throat and neck to reduce both forward and side flexion forces of the head on the neck. In order to accomplish the proper deployment and orientation of the inflatable member 142 when in its fully extended, operational orientation, the inflatable member 142 may be formed of a plurality of internal chambers which are concurrently inflated such that the inflatable member 142 assumes its protective position almost instantaneously.

As set forth above, additional preferred embodiments of the restraining assembly of the present invention comprise the global positioning, relative to the occupants and the interior of the vehicle, of the plurality of inflatable members. With reference to FIGS. 41 through 44, such inflatable members may include ceiling members mounted on the upper portion of the vehicle adjacent the ceiling and in a variety of different locations. At least some of the locations of the ceiling members, is the provision of cooperatively disposed anterior and posterior members designed to restrict motion and momentum of both the front portion and the rear portion of an occupant's head. The ceiling members are disposed and structured to cooperate with others of the plurality of inflatable members, as well as the restraining harness, but also optionally or independently thereof if desired.

Figure 41:
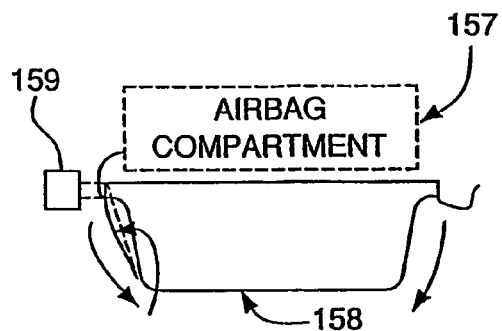
FIG. 41 is a front view of the embodiment of FIG. 40 in a different position.
Figure 42:
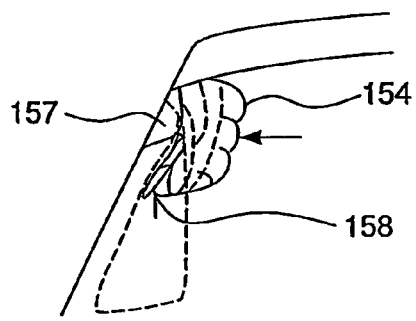
FIG. 42 is a side view in partial cutaway of the deployment of the inflatable member associated with the embodiment of FIGS. 40 and 41.

As shown in FIG. 26, the ceiling members include the anterior ceiling member 154 and the posterior ceiling member 156. The anterior ceiling member 154 is preferably mounted, in at least one embodiment of the present invention, in a compartment 157 located adjacent to and preferably behind the sun visor or like structure 158 as best shown in FIGS. 41 through 42. When activated into an inflated, operational orientation, the sun visor 158 is forced downwardly, either by the outwardly directed force of the inflatable anterior member 154 or by activation of a drive motor 159. In either case, upon activation of the anterior ceiling member 154 the sun visor 158 is forced downwardly in accordance with the directional arrows indicating the position of FIG. 41. The inflatable anterior ceiling member 154 will be deployed outwardly as shown in FIG. 42 to engage the frontal area of the head and face of the occupant 100. Also, the visor 158, in at least one embodiment, will serve as a support foundation or the like, and offer adequate or applicable resistance to the outwardly extended operational orientation, when inflated, of the inflatable member 154.

Figure 43:
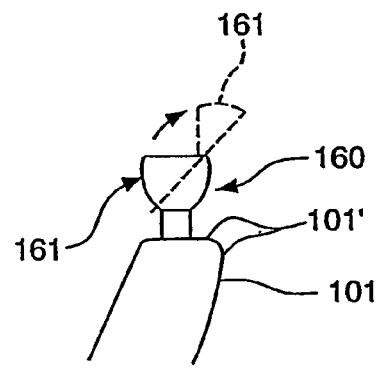
FIG. 43 is a side view in partial cutaway and phantom of another preferred embodiment of the restraint assembly of the present invention.
Figure 44:
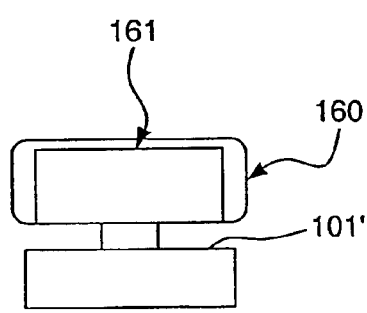
FIG. 44 is a front view of the embodiment of FIG. 43.
Figure 45:
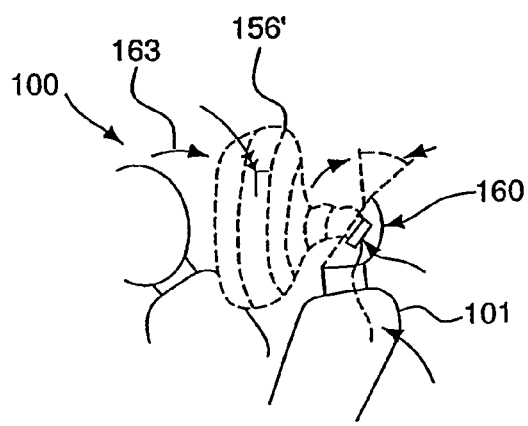
FIG. 45 is a side view of the embodiment of FIG. 43 with an inflatable member in at least a partially deployed operative orientation.

In addition, and in cooperation therewith the inflatable posterior member 156, as indicated in FIG. 26, may be located in a head rest, generally indicated as 160 and mounted on the upper peripheral portion or end of the car seat 101 as at 101'. With primary reference to FIGS. 45 through 45, the head rest 160 may include an interior chamber and a padded or cushioned cover member 161 disposed in overlying, closing relation thereto. As shown in FIG. 43 the cover member 161 is movable, upon activation of the inflatable member 156' from the closed position to the open position. Upon opening, and upon inflation the inflatable member 156' will extend outwardly away from the head rest 160 so as to engage and protect as well as absorb forces from a deceleration 163 of the head of the occupant 100 as best shown in FIG. 45.

Figure 46:
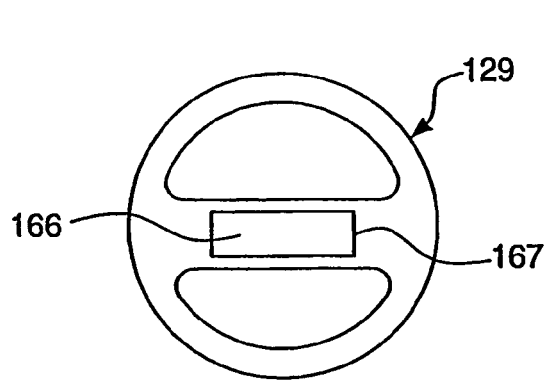
FIG. 46 is a front view of a steering wheel associated with a vehicle in which the restraint assembly of the present invention is located.
Figure 47:
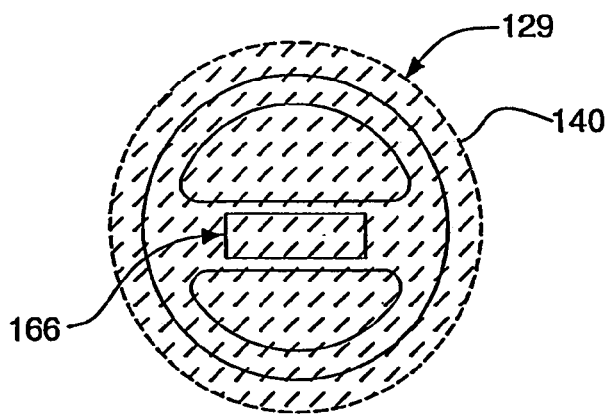
FIG. 47 is a front view of an inflatable member associated with the steering wheel of FIG. 6 disposed in an at least partially deployed, operative orientation.
Figure 48:
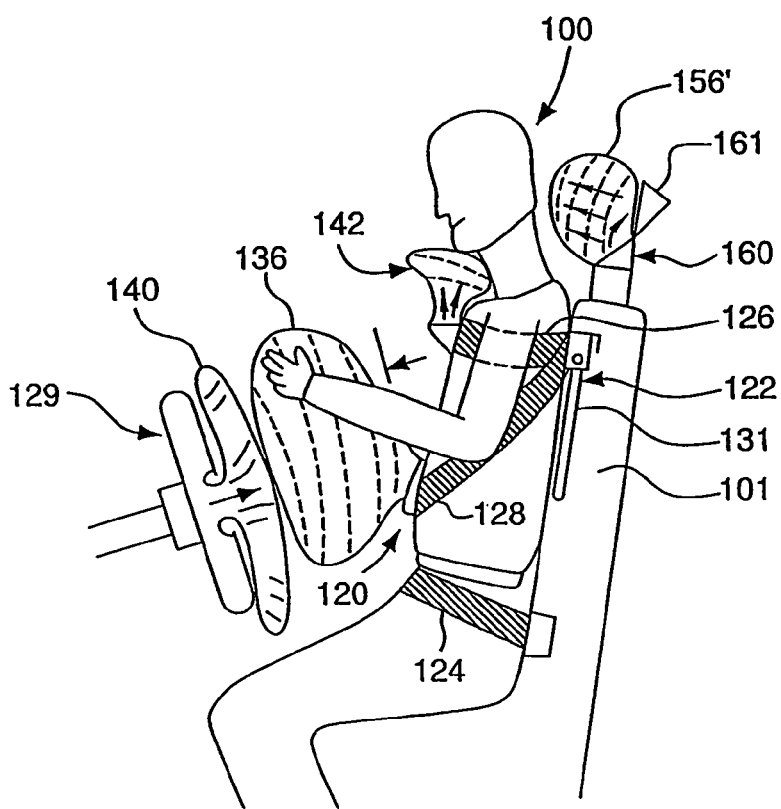
FIG. 48 is a side view of the relative positions of cooperatively disposed and activated inflatable members associated with the restraint assembly of the present invention.
Figure 49:
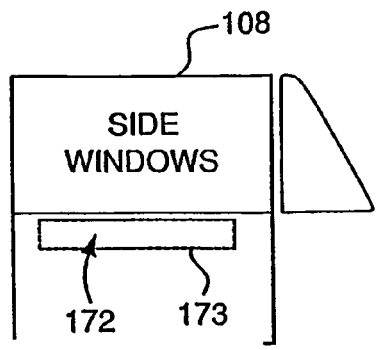
FIG. 49 is a front view of an interior side window of a vehicle adjacent which the restraint assembly of the present invention is mounted.
Figure 50:
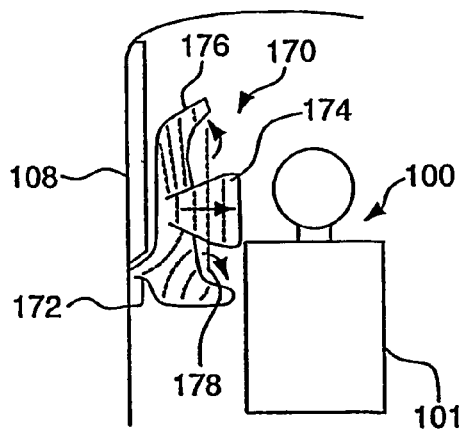
FIG. 50 is a rear view of the embodiment of FIG. 49 with an inflatable member deployed in an operative orientation.
Figure 51:
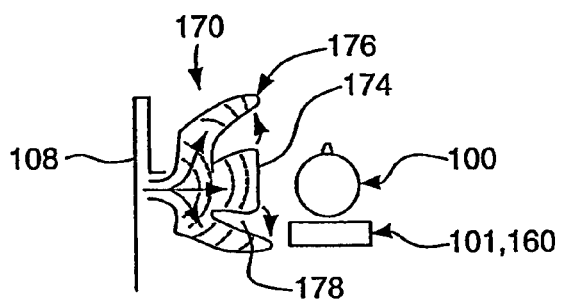
FIG. 51 is a top view of the embodiment of FIG. 50.
Figure 52:
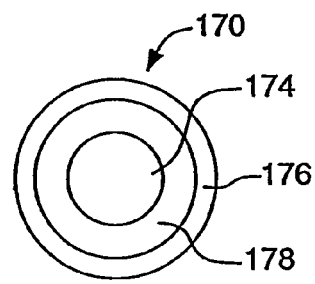
FIG. 52 is a front view of the inflatable member of the embodiment of FIGS. 50 and 51.
Figure 53:
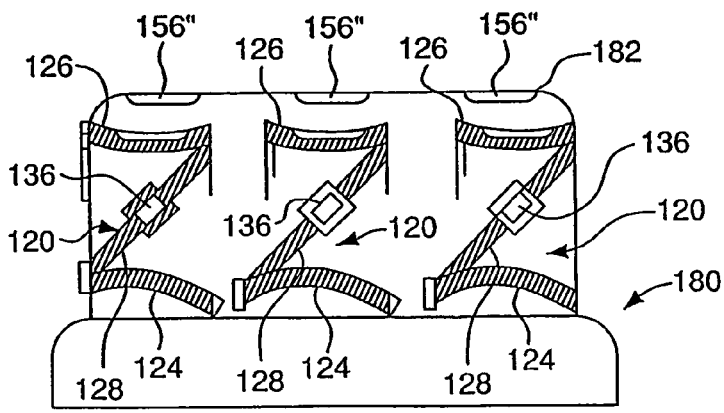
FIG. 53 is a front view of yet another preferred embodiment of the restraint assembly of the present invention.
Figure 54:
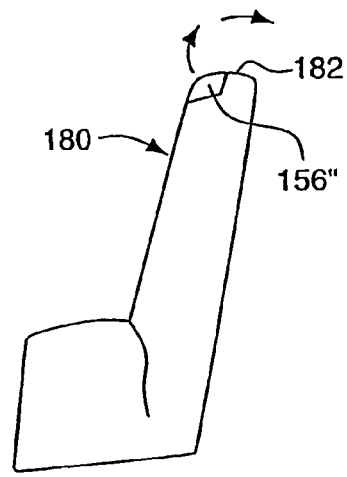
FIG. 54 is a side view of the embodiment of FIG. 53.

With primary reference to FIGS. 46 through 48 and as set forth above, the plurality of inflatable members of the restraining assembly of the present invention further comprises a steering wheel member 140. The steering wheel member 140 is located, when in its stored position, within a chamber 166 having an appropriate cover or lid 167. When activated, the inflatable steering wheel member 140 extends outwardly from the exposed face of the steering wheel 129 through an opening in the retaining chamber or compartment 166 and after the closure 167 has been displaced from its covering position. As best shown in FIGS. 47 and 48 the steering wheel inflatable member 140 preferably comprises a flat, somewhat circular or round configuration. Moreover, the diameter or transverse dimension of the inflatable steering wheel member 140 is somewhat greater than that of the steering wheel 129. This will prevent the occupant 100 from impacting with any portion of the steering wheel 129. Also, the substantially flat configuration of the steering wheel member 140 preferably is defined by a depth or width of approximately 2 to 3 inches. This of course significantly differs from prior art air bags which issue from the steering wheel, and deploy toward the passenger with force.

The flattened configuration of somewhat limited width or depth, as set forth above, is permissible since the steering wheel member 140 is designed to cooperate with and confrontingly engage the inflatable member 136 which extends outwardly from the diagonal restraining harness 120. The inflatable member 136 is disposed in aligned, confronting relation to the steering wheel member 140, whether the member 136 is extended outwardly from the diagonal belt segment 128 or the chest belt segment 126. Therefore, the purpose of the steering wheel member 140 and its cooperative relation to the inflatable member 136, associated with the harness assembly 120, is to reduce risk of blunt trauma to the chest and abdomen, or other frontal area portions of the occupant 100 by acting as a buffer between the occupant 100 and the steering wheel 129. It is important to note that one feature of the present invention is the outward extension of the inflatable member 136 away from the harness assembly 120 and also away from the frontal area of the occupant 100. Therefore the steering wheel member 140 and the harness inflatable member 136 cooperatively oppose, in summation effect, the angular momentum of the head/neck/body due to deceleration, reducing the impact forces on the chest, abdomen, and other frontal area portions of the occupant 100. Optionally, an under steering column airbag unit may be placed to deploy downward to protect the pelvis and legs.

With reference to FIGS. 49 through 52, yet another preferred embodiment of the present invention comprises the plurality of inflatable members, being activated through operation of the CPU or processor assembly 20, as set forth above and further including a side or window inflatable member generally indicated as 170. The inflatable member 170 is disposed above or beneath or otherwise substantially adjacent to the window or side portion 108. As such, when in its stored position, the inflatable member 170 is disposed within a compartment 172 having an appropriate closure or cover member 173. Once activated, the inflatable member 170 issues from the chamber 172 once the cover 173 has been displaced.

The dimension, configuration and disposition of the inflatable member 170 is such that it protects the side, head, neck, etc. against side injuries due to lateral flexion/rotation of the occupants body. In order to accomplish this, and as best in shown in FIG. 52, the inflatable member 170 has a sectional or a segmented construction. The segmented structure includes a central portion 174 which extends outwardly into an operational orientation when inflated so as to engage primarily the head area or lateral portion of the head. In addition, the inflatable member 170 includes an outer, substantially surrounding peripheral portion 176 disposed in spaced relation to the central portion 174, wherein the separating space 178 also has a substantially annular configuration. Accordingly, it is readily apparent that the inflatable member 170 is somewhat dish-shaped and generally similar to a round shield-like structure. As such, the central portion 174 provides extra protection or buffering against side impacts of the vehicle. The surrounding peripheral portion 176 folds in overlapping relation to the central portion 174 in accordance with the provision of a plurality of fold lines or creases appropriately formed on the inflatable member 170. The folding, overlapping relation of the various parts 174 and 176 relative to each other and to the open surrounding space 178 is of course accomplished when the inflatable member 170 is in its stored position, as set forth above.

Yet an additional feature of the present invention is the structural adaption of a plurality of the embodiments, as set forth above, to a vehicle seat 180 which may be considered a rear seat or be located within the vehicle at various locations depending on the size and capacity of the vehicle. As such, the seat 180 includes a plurality of seat locations. Each seat location is equipped with a harness assembly 120 and is disposed in association with appropriately disposed inflatable members 136. As with the embodiment of FIGS. 27 and 28, each of the restraining harness assembly 120 of each seat location comprises the lap belt segment 124, the chest belt segment 126 and the diagonal belt segment 128 collectively oriented or disposed in the aforementioned "Z-shape" configuration, wherein the lap and seat belts 124 and 126 are substantially horizontally oriented and the diagonal belt segment 28 extends from one end 126 diagonally across the area to be occupied by a passenger to an opposite end of the lap belt 124. In addition, the ceiling inflatable members may include a posterior member 156" mounted, when in its stored position, in a head rest built in to an upper portion of the seat as at 182.

Again with reference to FIGS. 22 through 24, the plurality of inflatable members which define the restraint assembly of the present invention further includes a side member 113. The side member 113, when in a stored position is disposed in an appropriately located chamber and positioned substantially adjacent the outer shoulder of an occupant 100. Upon the occurrence of an emergency event the side member extends outwardly into engagement with a shoulder, arm or other lateral portion of the occupant 100 to further protect against trauma and provide a buffer against side and/or oblique type impact.

It is again emphasized that in the most preferred embodiments the plurality of inflatable members are each connected to some type of fluid source and are cooperatively structured therewith so as to be almost instantaneously activated and thereby inflated outwardly or in the indicated direction into an operational orientation so as to protect the one or more occupants within the vehicle. Further, the fluid source, and at least some of the inflatable members are controlled in the most preferred embodiments by the aforementioned processor assembly 20, which is responsive to the one or more impact sensors 14, as well as the valve assembly and pressure sensor assembly 46 described in detail with regard to FIGS. 1 through 15. The infilling pressure generated by the inventive assembly is ideally determined generally by the weight of at least a person's head and speed of the vehicle, which are inputted and/or monitored by the computer processor and communicatively integrated within the assembly, such that it is structured to initiate a safe in-filling of fluid to respond to injury forces without being the cause itself of injury forces, thus providing an "intelligent" instantaneous computerized response. Because of computer monitoring of car speed continually, airbag filling pressures will vary with speed but will be maintained within physiological limits, so that risk of injury from airbag pressure is minimized or nearly eliminated.

Figure 55:
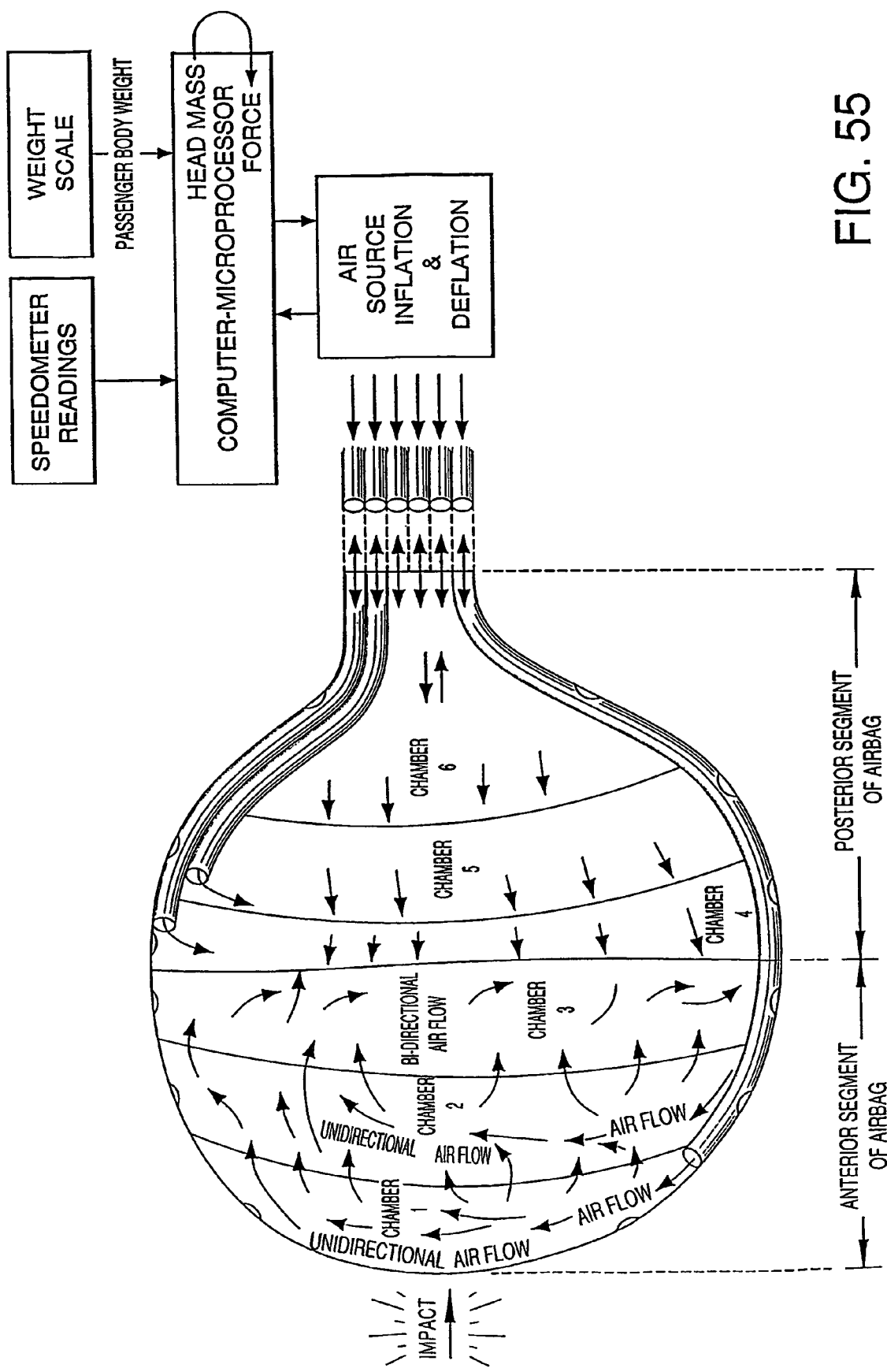
FIG. 55 is a schematic representation of yet preferred embodiment of the present invention relating to operational and structural features of at least one of the plurality of inflatable members of the restraint assembly of the present invention with a controlling/regulating, computer/microprocessor.

With reference to FIG. 55, yet an additional preferred embodiment of the present invention relates to an alternate construction and operation of at least one of the plurality of inflatable members associated with the restraining assembly of the present invention. The in-filling dynamics of the air bag as shown in FIG. 55 is regulated, at least in part, by a computer/microprocessor and various sensor assemblies that may be strategically mounted on or otherwise associated with the vehicle. However, and as also shown in FIG. 55 the indicated computer/microprocessor takes into consideration the speed of the vehicle at the time of an accident or impact and processes such data along with physical characteristics of the occupant or passenger. Such physical characteristics include the weight of the occupant which in turn may be determinative of the mass/weight of the occupant's head. Further, this embodiment may include the provision of some type of weight scale, preferably associated with the vehicle itself. The weight scale as well as other sensor assemblies, such as those shown in FIG. 55, may communicate directly with the computer/microprocessor. Therefore pertinent data is associated and processed such as, but not limited to, the speed of the vehicle, the weight of the passenger and the mass/weight of the passenger's head which, anatomically is generally about 7% of body weight. This data, once properly processed will in turn be at least partially determinative of the in-filling dynamics of the one or more inflatable members, of the type shown in FIG. 55 being regulated by the computer/microprocessor and the data received from one or more of the associated sensor assemblies as disclosed.

Figure 56:
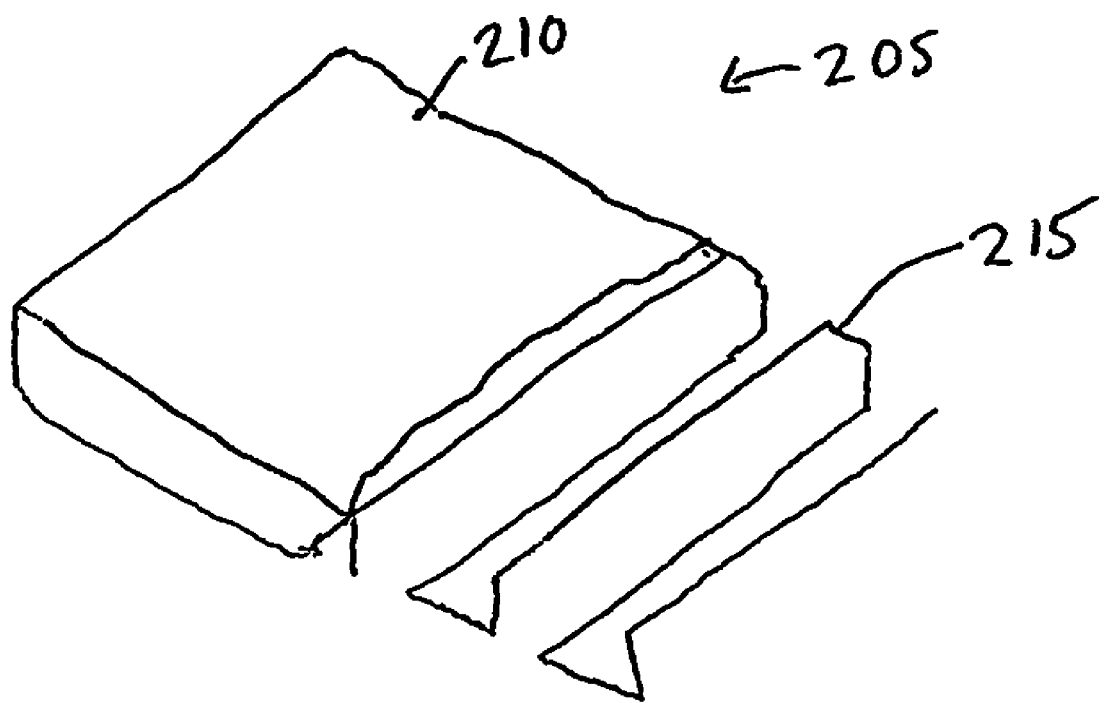
FIG. 56 is a representation of a fluid conduit of the invention.

As will be appreciated, in the system of the invention, conduits are provided between a source of pressurized fluid and each inflatable member. The source of pressurized fluid may be one or more liquid generating systems located in the automobile. The conduits are preferably permanently open, so that the conduits do not require the fluid pressure for inflation. In order to obtain a relatively large cross-sectional area, a relatively wide and low or flat profile is desirable. For example, the conduit may be between 2 inches and 2.5 inches in width and about 0.25 to 0.375 inches in height. This permits them to placed under the floor, in the roof of the passenger compartment and in the side walls above and below the doors. The conduits may be made of a flexible sheet material substantially impervious to the fluid and reinforced with substantially rigid ribs. The substantially rigid ribs may be any suitable material, such as a metal, plastic or composite wire in a spiral formed into the desired shape. Referring to FIG. 56, there is shown an exemplary section of conduit 205 with skin 210 of a flexible sheet material. Skin 210 is shown in partial cutaway to reveal ribs 215 formed in a generally spiral configuration. The wide, flat configuration permits the movement of large volumes of air quickly.

Figure 57:
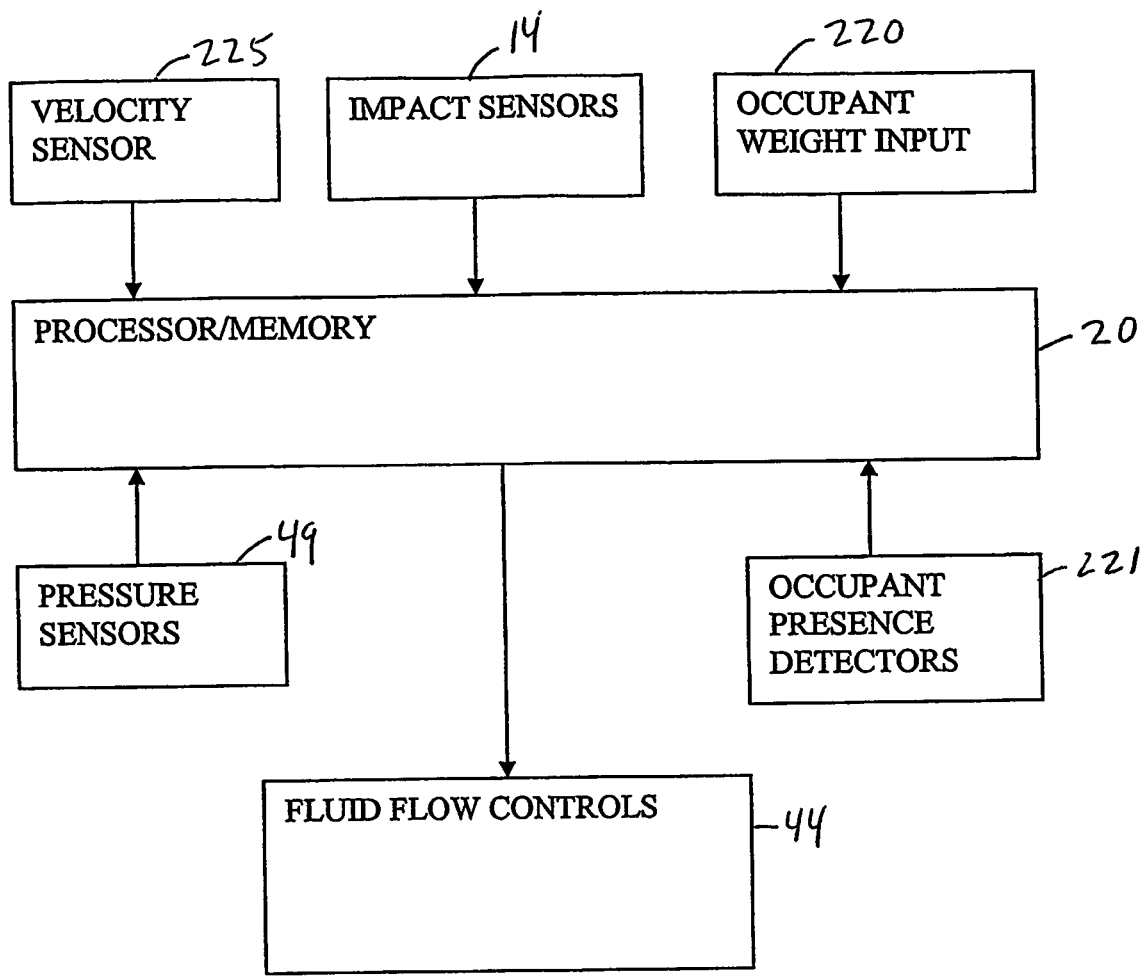
FIG. 57 is a schematic representation of components of an alternative system of the invention.

In a system of the present invention, a variety of data is obtained and provided to one or more data processors for the purpose of controlling the selection, timing, inflation speed and air pressure in inflatable restraints in a vehicle. Data useful to the system includes the speed of the vehicle, the location on the vehicle of the impact, and the weight of the occupants, and more specifically the weight of the head of each occupant. Referring to FIG. 57, there is shown a block diagram depicting processor/memory 20 and various sources of data, including impact sensors 14, weight data interfaces 220, velocity sensors 225, and pressure sensors 49. Occupant presence detectors 221, in the form of weight or pressure sensors located in the vehicle seats, may provide an indication as to whether an occupant is located at each intended occupant location in the vehicle but are preferably not used to determine total body weight. Control signals are provided to fluid flow control in the form of valve assemblies 44.

Figure 58:
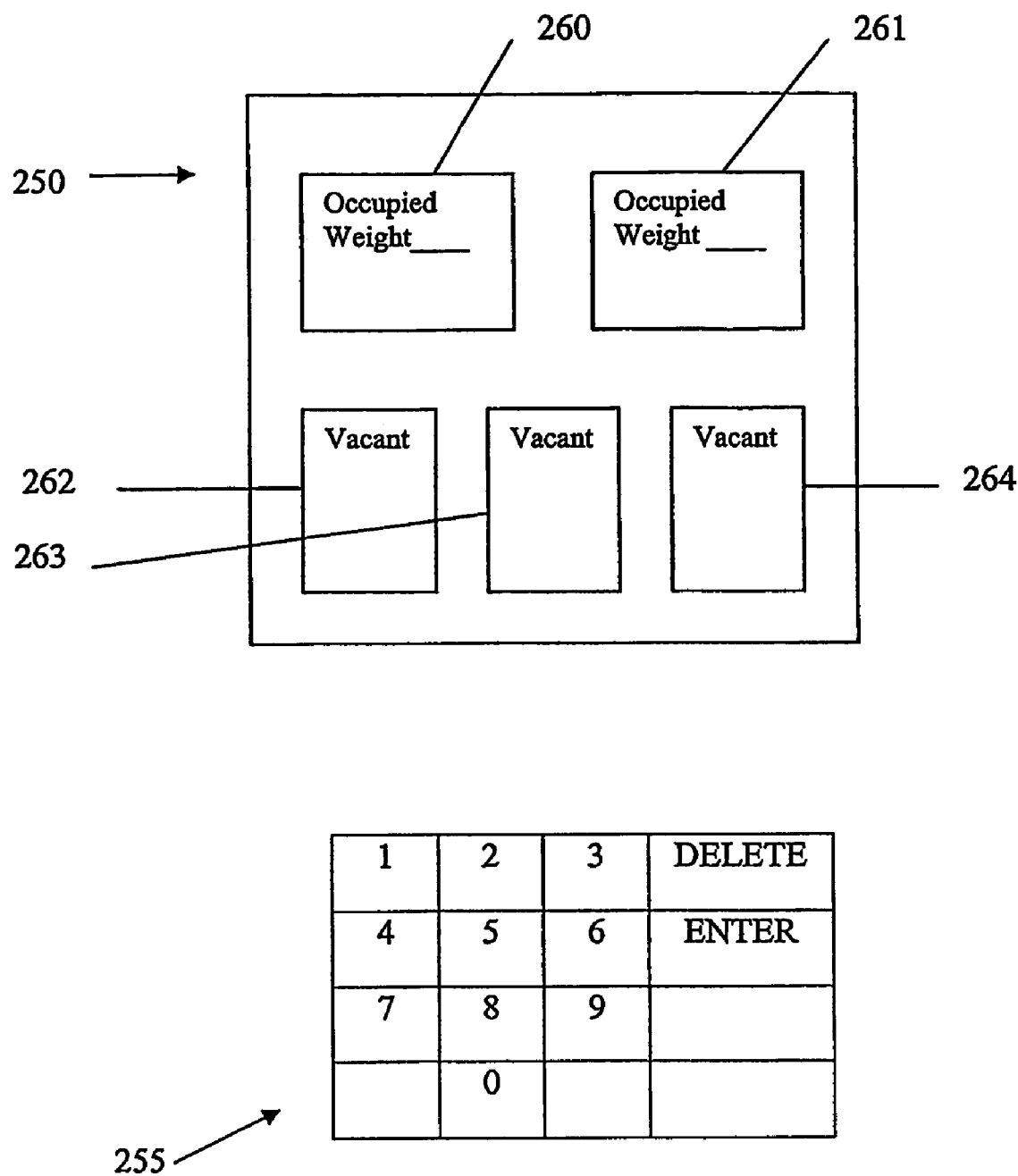
FIG. 58 is a representation of a weight input interface in accordance with the invention.

The weight of each occupant and the weight of the head of each occupant may be obtained in a variety of means. The weight of the head of an adult is typically within a range of the percentage of the total body weight of the adult. The range is in the neighborhood of seven percent of the weight of the adult. The weight of the adult can be obtained, and then the weight of the head can be calculated by a suitable algorithm. One means of obtaining weight information is by obtaining the information from the individual, without the need for weight sensors. For example, an interface may be provided within the automobile to prompt the input of the weight of the driver and each passenger by location. The interface is under the control of a programmed controller. This controller may be separate from processor 20, or control of the interface may be under processor 20. The interface may include an alphanumeric display and one or more input devices, such as a keypad, touchscreen, or screen that senses contact with a stylus. The interface may prompt an input of the location of the driver or passenger. For example, keys may be provided for each driver and passenger location. A diagram of the passenger compartment of an automobile may be superimposed with keys at the locations. After the location of the driver or passenger is input, the controller may cause the interface to prompt for input of the person's weight. A numeric keypad, for example, may be provided for an input of the person's weight. When the weight is received, the display may prompt confirmation of the received data, and acknowledge receipt of the data. Sensors may be located in the passenger seats to detect the presence of a passenger. These sensors may provide information to the controller, which will prompt for an input of a weight as to each seat that is detected as occupied. Referring to FIG. 58, an exemplary display 250 with input keypad 255 is shown. The display and keypad may be located on the instrument panel of the vehicle. Display 250 has an indication 260, 261, 262, 263, 264 for each seat, and which show, based on data from a sensor in the seat, as to whether the seat is occupied, as provided by indicators 260, 261 for the front seats, or vacant, as provided by indicators

262, 263 and 264 for the rear seats. For each occupied seat, in this case the front seats, the user is prompted to input the occupant's weight using keypad 255. A flashing cursor may be used as a prompt, and input keypad 255 may include keys to permit navigation through the seat indications 260 of display 250. Other variations may be employed. For example, rather than a need to provide the passenger weight at each time that the vehicle is started or a passenger enters the vehicle, the programmed controller may store the weights of a list of frequent drivers and passengers associated with name information. Name information may then be entered in lieu of weight information. Weight sensors may also be provided. For example, weight sensors may be provided at various locations in the vehicle, such as in the lower part of the door opening. The occupant will, for example, stand on the door edge or a running board to be weighed. Occupants may be prompted by the aforementioned display to step on one of the sensors for a sufficiently long time that the weight of each of the occupants may be obtained. The weight information may be stored in a memory device that may be accessed by the processor.

The vehicle speed may be provided to the processor by receiving motion data from the axles. The data may be the same data employed by a conventional speedometer, or may be obtained by one or more separate sensors. The vehicle speed data may be stored in a memory device that may be accessed by the processor. The vehicle speed data is preferably updated.

Information as to a point of impact may be obtained from impact sensors distributed at various locations on the perimeter of the vehicle. A variety of technologies are known for serving as impact sensors. These sensors may be provided at least in the front, each side, and rear, and may be distributed at intervals around the vehicle for greater sensitivity as to point of impact. Exemplary sensor locations are shown, as noted above, at 14 of FIG. 1. Sensors such as vibration sensors and pressure distortion sensors may be employed.

In the event of an impact between the vehicle and an object external to the vehicle, the following events occur. The receipt of a signal from one or more sensors commences the process of selecting the proper inflatable restraints, the sequence of inflation, and the pressure of inflation. A guiding principle is that the first impact between the occupant and the interior of the vehicle will occur generally between the location of the occupant and the location of the impact. This first impact between the occupant and the vehicle interior is frequently known as the "coup." The controller is programmed to cause the inflation of one or more restraints located generally intermediate each occupant and the detected location of the impact between the vehicle and an object external to the vehicle. A look up table may be provided to identify the one or more restraints to be inflated upon detection of impact at a particular sensor for each passenger and the driver. The speed of inflation is controlled by the controller's operation of the valves. The pressure is designed to counteract the force of the body and head of the individual. The force required is simply give by F=ma, where the mass is the mass of the body and the calculated mass of the head, and the acceleration is determined from the speed of the vehicle and an appropriate amount of time for the body or head to come to zero velocity relative to the restraint after colliding with the restraint. The magnitude of the acceleration may be based in part on vehicle velocity data obtained after the impact between the vehicle and an external object and correlated with time.

The controller is also programmed to inflate one or more restraints located opposite the initially-inflated restraints. The need for inflation of these restraints is required because, as discussed above, there is a second impact between the driver or passenger, or the head of the driver or passenger, subsequent to the first impact. This second impact is known as the "contra-coup." The timing of inflation of the opposite restraints is determined based on the velocity at the time of impact. The inflation of the restraints is thus sequential. The restraints intermediate the occupant and the location of the vehicle impact are inflated first. The restraints opposite the first-inflated restraints are inflated next.

The foregoing principles will be illustrated with examples. In a first example, a vehicle is proceeding forward at a velocity detected by a speedometer when an impact is detected at the front center of the vehicle. The controller selects restraints in front of the driver and each passenger based, for example, on a look-up table associating sensor data with appropriate restraints. The rate of inflation and desirable pressure within the inflated restraints will be selected based on the required force, which is based on the mass of the individual's head and the total body mass, taking into account speed at the time of impact and deceleration. The details of the algorithms may be determined by those of ordinary skill in the art. In general terms, for a given restraint, the greater the total body mass, the speed at impact, and the deceleration rate, the greater the force required, and hence the greater the inflation rate. Referring to the locations of restraints in FIG. 26, anterior ceiling restraint 154, belt restraint 136 and steering wheel restraint 140 are activated first in the event of an impact at the front center of the vehicle. Restraints illustrated at 156, located to the rear of the occupant's head, are inflated at a selected time after inflation of the forward restraints. The time of inflation of restraint 156 is selected to receive the occupant's head after the initial impact with the anterior ceiling restraint 154. In this way, infilling airbag pressures are physiologically determined and selected for each occupant based upon speed or acceleration and body weight.

If the impact between the vehicle and an object is detected at the rear of the vehicle, the processor will instruct inflation initially of restraints to the rear of the occupant location. By way of example, a headrest restraint, such as that shown at 156' of FIG. 24 is inflated. The inflation rate and pressure are calculated based on suitable algorithms from occupant body weight. Vehicle acceleration must also be factored into the calculation of the desired pressure. Subsequent to inflation of the headrest restraint 156', one or more restraints located opposite or generally opposite to the headrest restraint may be inflated. For example, forward ceiling restraint 154 may be inflated subsequent to inflation of headrest restraint 156'. The occupant's head initially moves rearward relative to the vehicle interior and impacts inflated headrest restraint 156'. The occupant's head then rebounds and moves forward to impact forward ceiling restraint 154, which has been subsequently inflated. Because of the ability of the z-belt to reduce the long lever action of the spine on the pelvis and to reduce momentum, the sizes of the airbags of this various units can be much smaller than conventional units, and will reduce production costs.

In another example, a vehicle is proceeding forward at a speed detected and provided to the controller when an impact is detected near one side of the vehicle at the front. Such an impact results in motion of the occupants in a rotational pattern relative to the vehicle interior. Such a rotational motion is illustrated by way of example in FIGS. 20 and 21. The rotational motion of FIGS. 20 and 21 is characteristic of an occupant after an impact at the front right side of the vehicle. The sequence of restraint inflation is design to anticipate this rotational motion. By way of example, referring to FIG. 24, side forward restraints 170 and forward ceiling restraints 154 are inflated. These restraints may be inflated simultaneously. The occupant's head impacts restraints 170 and 154. The occupant's head may impact forward restraint 154 more than once, as the illustrated forward ceiling restraint has a concave surface, and the occupant's head is moving in a rotational pattern. Body restraints, such as belt mounted restraint 136 and steering wheel mounted restraint 140 may also be inflated simultaneously with ceiling restraint 154. Subsequent to the inflation of the side forward restraints 170 and forward ceiling restraint 154, a rearward restraint, such as rear ceiling restraint 156 is inflated. If the pressure detected from the rear ceiling restraint 156 is consistent with continued rotational motion of the occupant, then the side airbag 170 will be inflated again. The inflation of appropriate restraints will continue under control of the processor 20 until the pressure detected is sufficiently low to indicate that the motion of the occupant's head has ceased.

The selection of restraints for inflation may be determined based in part on speed of the vehicle at the time of impact of the vehicle and any detected subsequent speed. For example, if the vehicle is moving forward at low speed, and an impact is detected at the front of the vehicle, the selection of restraints may be fewer than those activated when an impact is detected at high speeds. In such an impact, the only restraints activated may be those forward and to the rear of the occupant location, and not window or side restraints. The speed of inflation and the desired pressures detected by the pressure sensors will be relatively low if the vehicle speed at the time of impact is relatively low. Alternatively, if an impact is detected when the vehicle speed is relatively high, all of the available restraints for each occupant location at which an occupant is detected may be inflated in a sequence and with pressures regulated by the processor. Infilling speeds and pressures will be relatively higher. A suitable algorithm may be developed by those of skill in the art which relates vehicle speed at the time of impact to infilling flow rate and desired pressure. In general, infilling flow rate and pressure will increase as vehicle speed at the time of impact increases.

A memory device associated with the processor preferably records the data received by the processor and the sequence of inflation and deflation of restraints under the control of the processor. Review of such memory data and examination of and interviews with occupants will permit refinement of look-up tables and algorithms for use by the processor.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A system for restraining occupants of a motor vehicle, comprising:
    a) a plurality of inflatable members mounted on the vehicle and collectively positioned in substantially surrounding relation to an occupant;
    b) a fluid source connected to said plurality of inflatable members;
    c) a pressure sensing assembly disposed to sense pressure of at least some of said plurality of inflatable members;
    d) a plurality of impact detectors positioned to detect a location of an impact between said motor vehicle and an object;
    e) a processor operatively connected to said pressure sensing assembly, said fluid source, and said impact detectors;
    f) each of said inflatable members cooperatively structured with said fluid source and said processor to inflate into an operative orientation upon instructions from said processor;
    g) wherein said processor provides instructions for selectively and sequentially inflating said inflatable members in response to a detected location of an impact, and for regulating pressure within said inflatable members.

2. A system as recited in claim 1, wherein a first one of said inflatable members located intermediate an occupant location and said detected impact location is inflated, and subsequently at least a second one of said inflatable members located opposite from said first inflatable member is inflated.

3. A system as recited in claim 1, wherein said processor receives vehicle speed information, and regulates pressure in said inflatable members based in part on said vehicle speed information.

4. A system as recited in claim 1, wherein said processor receives occupant weight information and regulates pressure in said inflatable members based in part on said occupant weight information.

5. A system as recited in claim 4, wherein said processor receives vehicle speed information, and selected inflatable members for inflation based in part on said vehicle speed information.

6. A system as recited in claim 4, further comprising a user input for providing occupant weight information to said processor.

7. A method for restraining occupants of a motor vehicle having a plurality of inflatable members mounted on the vehicle and collectively positioned in substantially surrounding relation to an occupant, in an impact involving the motor vehicle, comprising the steps of:
    a) detecting a location of the impact on the motor vehicle;
    b) in response to the detecting of the location of the impact on the motor vehicle, selectively inflating a first of the inflatable members; and
    c) subsequent to said step b), selectively inflating a second of the inflatable members;

wherein said first inflatable member is located intermediate an occupant location and the detected impact location, and the second inflatable member is opposite the first inflatable member.

8. A method for restraining occupants of a motor vehicle having a plurality of inflatable members mounted on the vehicle and collectively positioned in substantially surrounding relation to an occupant, in an impact involving the motor vehicle, comprising the steps of:
    a) detecting a location of the impact on the motor vehicle;
    b) in response to the detecting of the location of the impact on the motor vehicle, selectively inflating a first of the inflatable members; and
    c) subsequent to said step b), selectively inflating a second of the inflatable members; and
    receiving vehicle speed information, and regulating a pressure in said first inflatable member and a pressure in said second inflatable member based at least in part on said received vehicle speed information.

9. A method for restraining occupants of a motor vehicle having a plurality of inflatable members mounted on the vehicle and collectively positioned in substantially surrounding relation to an occupant, in an impact involving the motor vehicle, comprising the steps of:
    a) detecting a location of the impact on the motor vehicle;

b) in response to the detecting of the location of the impact on the motor vehicle, selectively inflating a first of the inflatable members;

c) subsequent to said step b), selectively inflating a second of the inflatable members; and receiving occupant weight information, and regulating a pressure in said first inflatable member and a pressure in said second inflatable member based at least in part on said occupant weight information.

10. A method for restraining occupants of a motor vehicle having a plurality of inflatable members mounted on the vehicle and collectively positioned in substantially surrounding relation to an occupant, in an impact involving the motor vehicle, comprising the steps of:

a) detecting a location of the impact on the motor vehicle;

b) in response to the detecting of the location of the impact on the motor vehicle, selectively inflating a first of the inflatable members; and c) subsequent to said step b), selectively inflating a second of the inflatable members;

wherein the first inflatable member and the second inflatable member are selected to anticipate rotational motion of an occupant.

11. An inflatable restraint assembly for motor vehicles, said restraint assembly comprising:

a) at least one inflatable member mounted within the vehicle adjacent an intended position of an occupant, b) a fluid source;

c) a permanently open conduit connecting said fluid source in communication with said inflatable member, d) a valve assembly mounted in flow regulating relation between said fluid source and said inflatable member, e) means for sensing pressure within said inflatable member, and f) a processor operatively connected to said valve assembly and said pressure sensing means, wherein said processor actively and continuously regulates pressure within said inflatable member in response to at least an initial impact force of the occupant with said inflatable member.

12. The inflatable restraint assembly of claim 11, wherein said conduit has a cross-sectional area of at least about one square inch.

13. The inflatable restraint assembly of claim 11, wherein said conduit has a width at least about 4 times its height.

* * * * *